US00RE36526E

United States Patent [19]

Braddick

[11] E Patent Number: Re. 36,526

[45] Reissued Date of Patent: Jan. 25, 2000

[54] RETRIEVABLE THROUGH TUBING TOOL AND METHOD

[75] Inventor: Britt O. Braddick, Houston, Tex.

[73] Assignee: TIW Corporation, Houston, Tex.

[21] Appl. No.: 09/113,176

[22] Filed: Jul. 10, 1998

Related U.S. Patent Documents

Reissue of:

[64] Patent No.: 5,595,247
Issued: Jan. 21, 1997
Appl. No.: 08/409,276
Filed: Mar. 23, 1995

U.S. Applications:

[63] Continuation-in-part of application No. 08/223,704, Apr. 6, 1994, Pat. No. 5,566,762.

[51] Int. Cl.[7] ..... E21B 29/06

[52] U.S. Cl. ..... 166/297; 166/117.6; 166/123; 166/208; 175/276

[58] Field of Search ..... 166/297, 382, 166/117.5, 117.6, 208, 217, 123, 181, 182, 242, 243; 175/258, 262, 274, 275, 276

[56] References Cited

U.S. PATENT DOCUMENTS

| | | | |
|---|---|---|---|
| 3,993,128 | 11/1976 | Braddick | 166/216 |
| 3,999,605 | 12/1976 | Braddick | 166/212 |
| 4,688,642 | 8/1987 | Baker | 166/382 |
| 4,942,924 | 7/1990 | Duncan | 166/290 |
| 5,154,231 | 10/1992 | Bailey et al. | 166/298 |
| 5,168,942 | 12/1992 | Wydrinski | 175/50 |
| 5,193,620 | 3/1993 | Braddick | 166/382 |
| 5,222,554 | 6/1993 | Blount et al. | 166/117.6 |
| 5,346,017 | 9/1994 | Blount et al. | 166/380 |
| 5,383,522 | 1/1995 | Hailey | 166/132 |
| 5,423,387 | 6/1995 | Lynde . | |
| 5,467,819 | 11/1995 | Braddick | 166/117.6 |
| 5,494,111 | 2/1996 | Davis et al. . | |
| 5,566,762 | 10/1996 | Braddick et al. . | |

FOREIGN PATENT DOCUMENTS

| | | |
|---|---|---|
| 2278136 | 11/1994 | United Kingdom . |
| WO95/07404 | 3/1995 | WIPO . |

OTHER PUBLICATIONS

Lynes 1978–79 Catalog, pp. 8 and 9.

Baker Production Packer Technical Unit, Unit No. 8484, 3 pages (date unknown).

*Primary Examiner*—H. Shackelford
*Attorney, Agent, or Firm*—Browning Bushman

[57] ABSTRACT

Retrievable window cutting apparatus and method include a whipstock assembly 160 and anchor assembly 10. Whipstock assembly 160 and anchor assembly 10 contract radially inwardly to pass through tubing string T and then expand radially outwardly to operate in casing C. Upper and lower independently moveable slips 24 and 26 engage casing C. Whipstock assembly 160 includes hinge assembly 170 that can be set for operation with a milling assembly 270. Cooperation between shear members in setting tool WSS, working string adaptor 180, hinge assembly 170, and anchor assembly 10 provide for keeping whipstock assembly 160 and anchor assembly 10 in a contracted position for passing downwardly through tubing T, expansion in casing C, and subsequent retrieval through tubing T.

49 Claims, 12 Drawing Sheets

10
C 288
40
174
164
192
204
199
200
194
197
40
196
132
198
38
138
136
300
314
132
308
304
306
44
302
42
312
10

58
130
56
128
126
62
124
66
22
26
34
32

RETRIEVABLE THROUGH TUBING TOOL AND METHOD

Matter enclosed in heavy brackets [ ] appears in the original patent but forms no part of this reissue specification; matter printed in italics indicates the additions made by reissue.

BACKGROUND OF THE INVENTION

This application is a continuation-in-part of U.S. patent application Ser. No. 08/223,704 filed Apr. 6, 1994 for a THRU TUBING TOOL AND METHOD, now U.S. Pat. No. 5,566,762.

FIELD OF THE INVENTION

The present invention relates generally to a through tubing assembly operable for cutting a casing window and, more particularly, to apparatus and methods relating to a retrievable through tubing whipstock assembly.

DESCRIPTION OF THE BACKGROUND

A whipstock may generally refer to a device inserted in a wellbore that is used for deflecting a drill bit or mill in a direction that is angularly offset with respect to the orientation of the original wellbore so as to establish a new or additional drilling course. In most instances, a whipstock procedure involves setting an anchor and providing an angled whipstock surface supported by the anchor at the desired depth in the wellbore to conduct side track or lateral directional drilling operations through the casing string.

It is frequently desired to cut or mill a window in a casing string that also includes therein a smaller diameter tubular string, such as for conducting wellbore fluids, that terminates at a position above the desired position of the window. It has typically been necessary to first remove the tubular string from the wellbore prior to performing the whipstock operation. Removal of the tubular string requires considerable rig time and expense, but is required to permit the entry of a full-bore whipstock assembly into the casing for positioning at the desired depth for then milling or cutting a window in the casing.

The face of the whipstock is oriented to position the casing window at a desired radial azimuth relative to the borehole axis in accordance with the new course of drilling. With the casing window properly positioned, the side track or lateral drilling operation may proceed in the desired azimuthal direction relative to the borehole. The face of the whipstock may be oriented using a multiple trip operation into and out of the wellbore.

The setting of anchors and whipstocks for purposes of milling windows in the casing string has been performed for many years. However, apparatus and methods have not heretofore existed that permit milling a window in the casing string by passage of a retrievable whipstock assembly through a smaller diameter tubular member, such as a production tubing string positioned within the casing. As well, more reliable apparatus and methods are desired for setting an anchor and a whipstock assembly within a casing positioned downhole by passing through a smaller diameter tubular member, such as a production string.

Consequently, there remains a need for apparatus and methods that offer the drilling industry the flexibility to reduce drilling time and costs by allowing installation and removal of a whipstock assembly at a desired position in the casing, and for reliably setting a whipstock assembly passed through a smaller diameter tubular member. Those skilled in the art have long sought and will appreciate the present Invention which provides solutions to these and other problems.

SUMMARY OF THE INVENTION

The downhole tool and method of the present invention may be used to cut a window, such as a casing window, in a tubular disposed in a wellbore. For this purpose, the method provides for retrievably positioning a downhole tool within a first tubular supported within a wellbore, the first tubular having therein a second tubular supported within the first tubular, and the second tubular having a lower end within the first tubular. The method generally includes connecting the downhole tool to a wellbore transport member. The downhole tool and the wellbore transport member are inserted inside of the wellbore containing the first and second tubulars. The downhole tool is thus moved with the wellbore transport member past the lower end of the second tubular. The downhole tool is moved with the wellbore transport member within a portion of the first tubular that does not contain the second tubular. Setting slips on the downhole tool are expanded to engage an inner wall of the first tubular. The downhole tool is disconnected from the wellbore transport member. A whipstock assembly is provided for the downhole tool and a portion of the whipstock assembly is expanded to engage the inner wall of the first tubular. The setting slips on the downhole tool are retracted from the inner wall of the first tubular. The downhole tool is retrieved from the wellbore.

The downhole tool for operation within the borehole generally includes a whipstock having a radially expandable portion moveable between a set position for engaging an inner surface of the borehole and an unset position radially offset from the inner surface of the borehole. A support member is secured to the whipstock that has a radial expandable slip assembly movable to a set position for engaging the inner surface of the borehole to secure the support member and the whipstock with respect to the borehole. The support member is also movable to an unset position such that the slips are disengaged from the inner surface of the borehole to allow the retrievable tool to be movable within the borehole. Furthermore, there is an interconnection to a borehole transport member.

The downhole tool may further include a body portion. A first sliding member is slidably secured to the body portion and is movable between a set position and an unset position. A second sliding member is slidably secured to the first sliding member and is movable between a set position and an unset position. At least one slip is slidably secured to the second sliding member. At least one slip is movable between a radially outwardly set position and a radially inwardly unset position. A first slip member is slidably secured to the slip and is radially moveable between the set position and an unset position. A second slip member is slidably secured to the first slip member and is radially movable between a set position and an unset position. The second slip member is axially spaced from the slip in the set position. The first and second sliding members are disposed radially between the slips and the setting member body portion in the set position.

It is an object of the present invention to provide an improved whipstock assembly and method.

It is another object of the present invention to provide a whipstock assembly that may be initially positioned and subsequently retrieved by passing through a small tubular that opens up into a larger tubular wherein a window, such as a casing window, is milled.

A feature of the present invention is an improved expandable and retractable slip assembly.

Another feature of the present invention is an expandable and retractable base portion of the whipstock member.

An advantage of the present invention is the elimination of the need to remove a tubing string before milling a window in a casing string below the tubing.

Another advantage of the present invention is ready access to the original casing string after the milling operation.

These and other objects, features, and advantages of the present invention will become apparent from the drawings, the descriptions given herein, and the appended claims.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENTS

The present invention provides a through tubing whipstock and anchor assembly for milling a window in a wellbore tubular that may be lowered through a smaller diameter tubular string and set for performing a whipstock operation within a larger diameter tubular string, and may subsequently be unset and retrieved from the wellbore through the smaller diameter tubular string.

Figure 1:
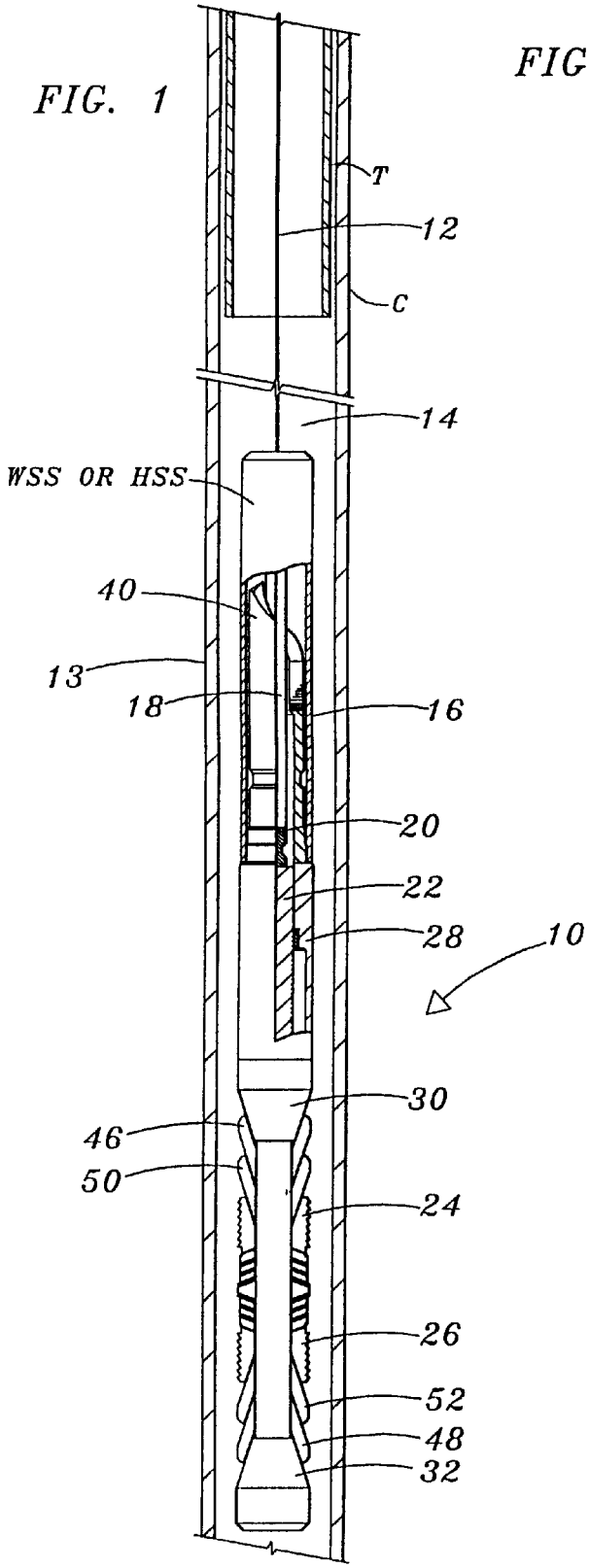
FIG. 1 is an elevational view, partially in section, of an anchor assembly suspended on a setting tool operable to pass through a smaller tubing string into a larger diameter casing string.
Figure 2:
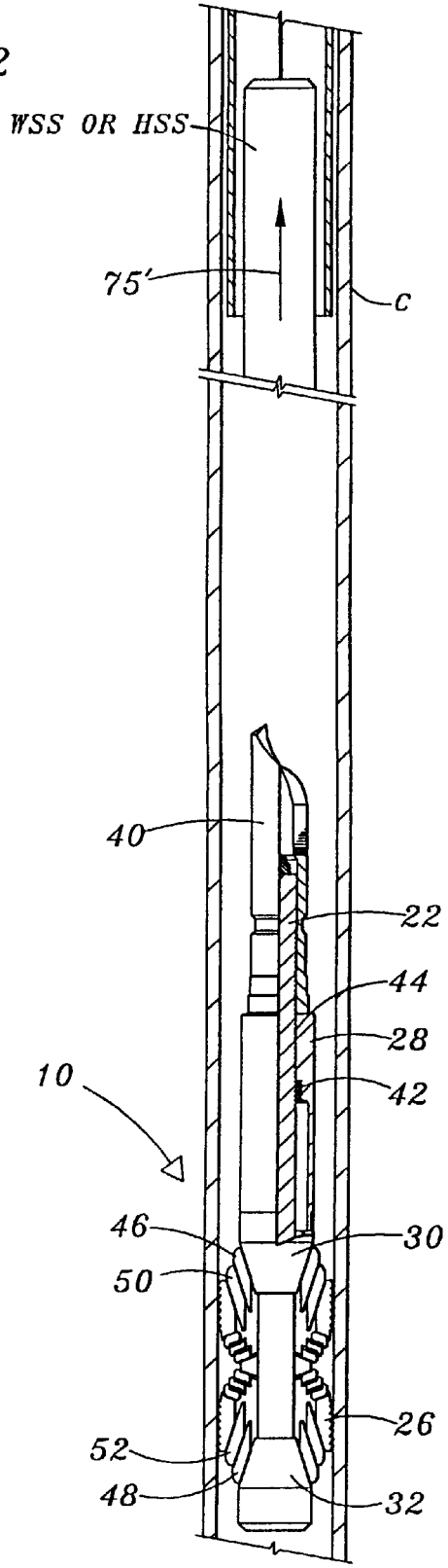
FIG. 2 is an elevational view, partially in section, showing the setting tool of FIG. 1 being retrieved back through the smaller diameter tubing string after setting of the anchor assembly within the larger diameter casing string.
Figure 3:
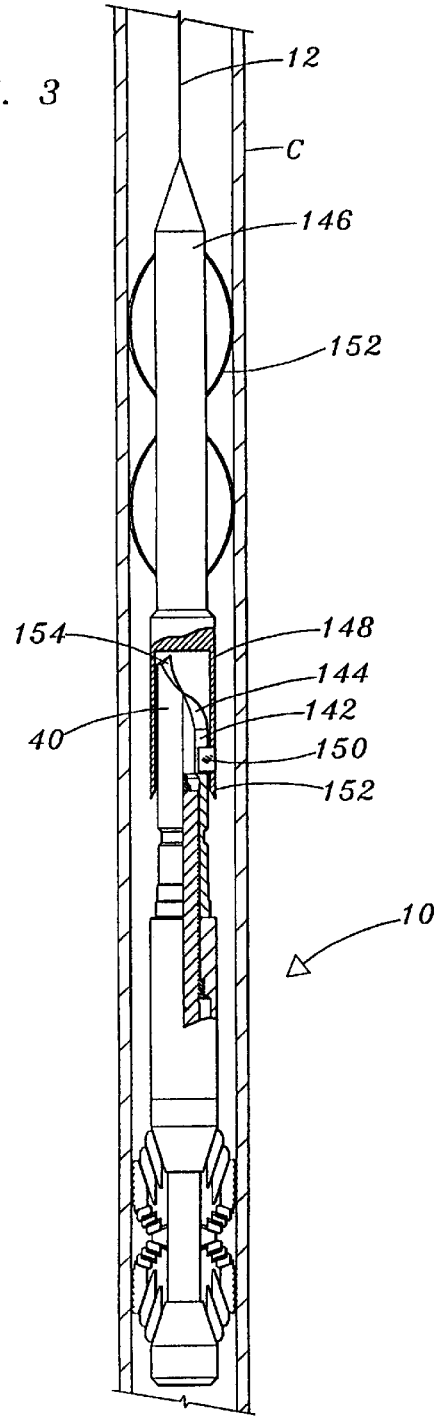
FIG. 3 is an elevational view, partially in section, showing a directional survey tool lowered onto the anchor assembly of FIG. 2 to determine the radial azimuth of the orientation slot in the riser of the anchor assembly.
Figure 4:
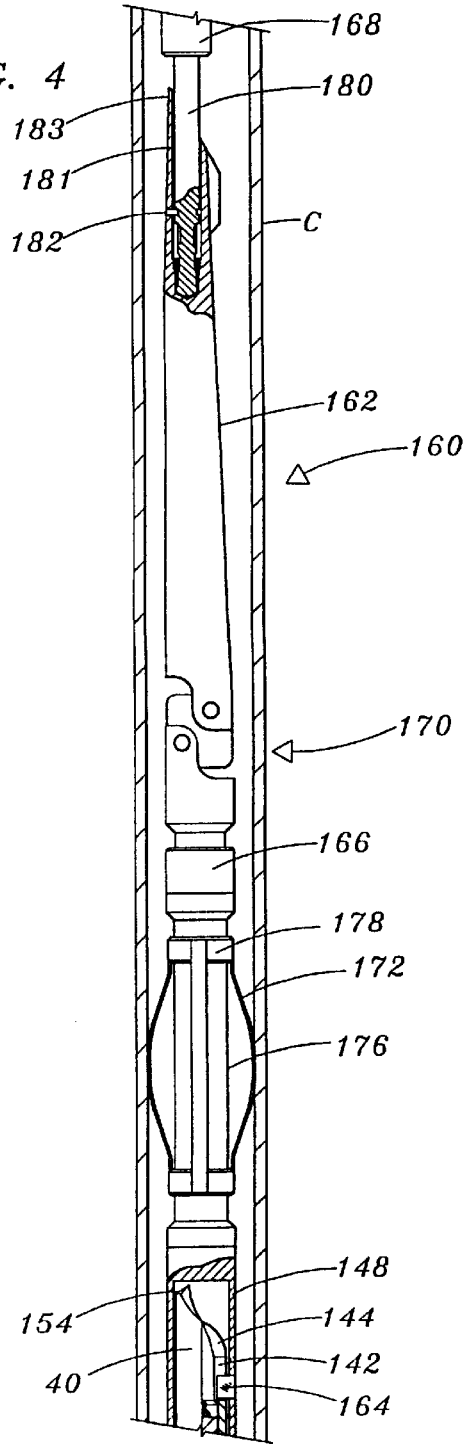
FIG. 4 is an elevational view, partially in section, showing an oriented whipstock assembly being secured to the anchor assembly of FIG. 3.
Figure 8:
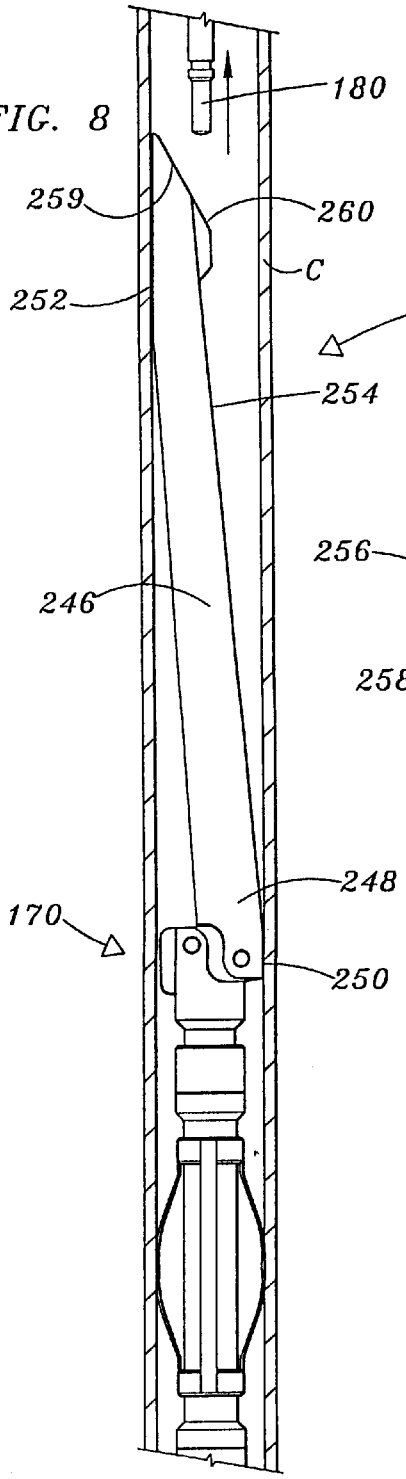
FIG. 8 is an elevational view, partially in section, showing the working string being retrieved from the wellbore after setting the whipstock assembly into position for milling.

By way or example only and not by way of limitation, a whipstock operation according to a presently preferred embodiment of the invention may proceed by first lowering the anchor assembly, that is attached to an electrically activated setting tool, through the bottom of the tubing into a casing string as schematically indicated in FIG. 1. It will be understood that the anchor assembly may also be lowered from a coiled tubing string or work string, then set with a hydraulically activated setting tool. After the anchor assembly has been set within the casing string, the setting tool may be removed as shown in FIG. 2. A survey tool having an orientation lug is then lowered onto a whipstock orientation slot in the anchor assembly for receipt of the orientation lug. The survey tool is releasably supported by the expanded anchor assembly as shown in FIG. 3. After obtaining the orientation information, the survey tool is removed from the wellbore and the orientation information from the survey tool is used on the surface to orient the whipstock face with respect to a corresponding orientation lug disposed on the lower portion of the whipstock latch assembly. In this manner, the whipstock face will be oriented so that the casing window will be milled at the desired radial azimuth of the wellbore. The whipstock assembly is then lowered onto the anchor assembly for accurate orientation by the orientation lug and is secured to the anchor assembly as shown in FIG. 4. The whipstock assembly is set for operation and the work string removed from the borehole as shown in FIG. 8. The milling operation may proceed as shown generally in FIGS. 9–11 beginning with a starter mill to initiate the milling operation of the casing window. After completing the milling operation and the side track or lateral directional drilling operation, the whipstock assembly and anchor assembly may be unlocked from the set position and retrieved from the wellbore as indicated in FIGS. 19–24. Alternatively, the whipstock assembly may be retrieved while the anchor assembly remains secured to the casing, as explained below.

For convenience of understanding only, descriptive terms such as "upwardly", "downwardly", and the like, may be used in this specification to conveniently describe the present invention in association with the accompanying drawings. However, it will be understood that such terms are used for explanatory purposes only and are not to be construed in any manner as limiting the invention. Those skilled in the art will recognize that often the orientation and configuration of the equipment described herein may be different from that illustrated in the accompanying drawings and that this terminology is used only for case of understanding the presently preferred embodiments of the present invention. As well, when referring to depth in a wellbore, this will generally mean a length of the wellbore rather than a specific elevational depth so that an offset well may have a deeper depth than a straight well even though both end at the same elevational depth.

Referring now to the drawings, and more particularly to FIG. 1, there is shown a through tubing anchor assembly 10 in accord with the present invention. Anchor assembly 10 may be lowered into the casing C, set in wellbore 13, through the tubing T by means of wireline 12 or by means of a working string as discussed in U.S. application Ser. No. 08/223,704 filed Apr. 4, 1994 and incorporated herein by reference. For example only, casing C may be a 7 inch O.D. casing and tubing T may be a 4½ inch O.D. tubular production string.

Wireline 12 may be used to accurately position the depth of anchor assembly 10 within the bore 14 of casing C using collar locator (not shown) and/or other depth control device as is normally utilized along with a wireline setting tool WSS. Thus, the depth position for setting anchor assembly 10 may be correlated to the desired formation strata or other desired position in the wellbore in a manner known to those skilled in the art so that a side track or lateral drilling operation or other type of drilling operation may proceed along a predetermined optimal path. A hydraulic setting tool HSS may also be used as desired and may be supported by a working string that may include coiled tubing or individual tubulars threadably secured together. In some cases, it may be necessary to provide a setting tool with a stroke somewhat longer than may by typical due to the need for the slips of anchor assembly 10 to expand radially outwardly from the anchor by a distance that is significantly greater than is common in the standard full bore entry operation.

Wireline setting tool WSS may be adapted for attachment to anchor assembly 10 by means of an adaptor kit that includes adaptor setting sleeve 16, mandrel adaptor 18, and shear stud 20 as schematically indicated in FIG. 1. As schematically indicated more clearly in the enlarged view of FIG. 12, anchor mandrel 22 is secured to mandrel adaptor 18 by means of shear stud 20. The entire weight of anchor 10 is supported by shear stud 20 below wireline setting tool WSS. Thus, when shear stud 20 shears into two pieces at weak link portion 21 due to a predetermined separation force applied thereto, setting tool WSS will then be separate from anchor 10 and may be retrieved to the surface with wireline 12.

Figure 12:
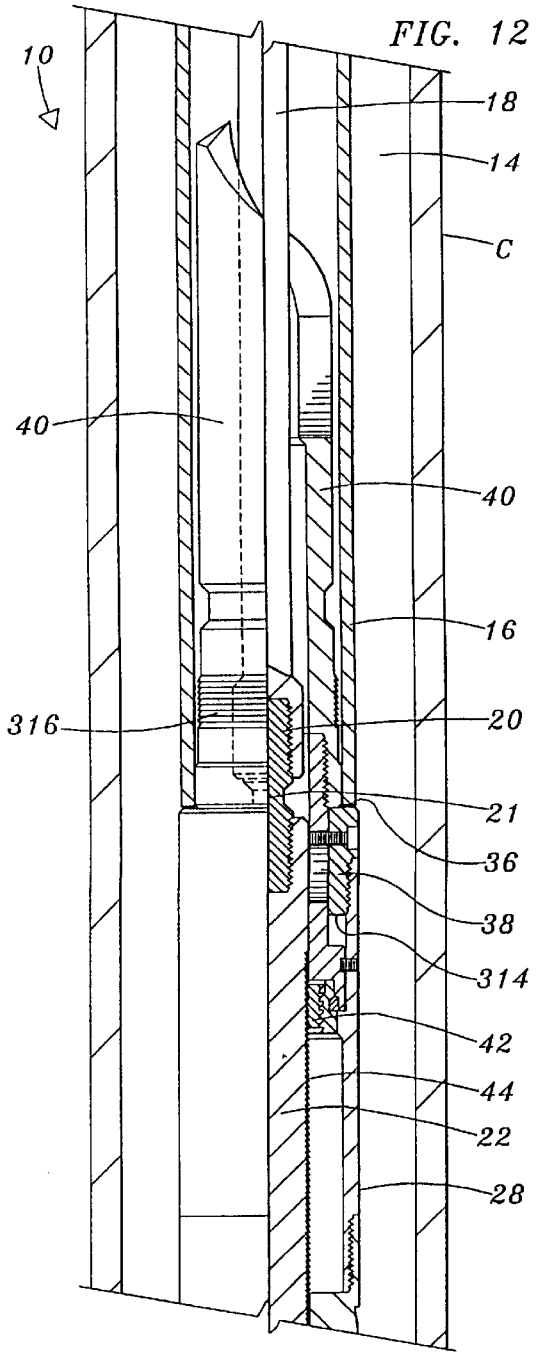
FIG. 12 is an elevational view, partially in section, showing a setting tool attached through a shear stud to the upper portion of the anchor assembly prior to setting the anchor assembly in the casing.
Figure 13:
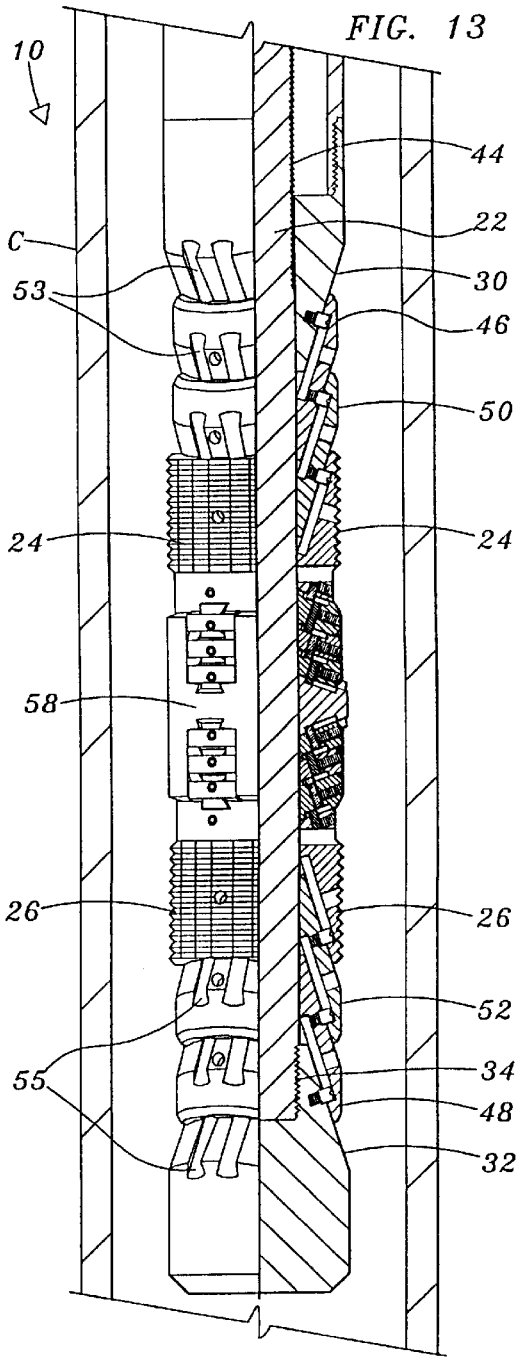
FIG. 13 is an elevational view, partially in section, showing a lower portion of the anchor assembly with the expanders, slip links, and casing slips in a collapsed or retracted position.

Prior to actuating wireline setting tool WSS, shear stud 20 has upper and lower threaded portions spaced apart on either end from weak link portion 21 as shown in FIG. 12. Upper and lower slips 24 and 26, respectively, are in the unset, collapsed, or retracted position to allow anchor assembly 10 to be lowered through smaller diameter tubing T into larger diameter casing C as shown in FIG. 13. Thus, the outer diameter of anchor assembly 10 is smaller than the smallest inner diameter portion of tubing T by a clearance factor that may typically be at least ⅛ of an inch. FIG. 13 shows the lower portion of the unset anchor assembly 12 in a detailed view. It will be noted that the smoother surfaces of anchor assembly 10 preferably have the largest outer diameter of the anchor assembly so as to substantially prevent sharper elements, such as the metallic slips, from engaging the tubing or casing prior to reaching the desired depth of setting.

Anchor mandrel 22 threadably secures to and extends from shear stud 20. Anchor mandrel extends downwardly through anchor sleeve 28, through upper expander 30, through upper and lower slips 24 and 26, and to lower expander 32 where it is threadably secured with threaded connection 34.

As shown in FIG. 12, adaptor setting sleeve 16 abuts shoulder 36 of upper bushing 38 of anchor 10. Thus, shoulder 36 transmits any relative downwardly directed force applied by adaptor setting sleeve 16 to upper bushing 38. Furthermore, any downwardly directed force applied by adaptor setting sleeve 16 to upper bushing 38 is also applied to upper expander 30 that is fixable secured to upper bushing 38 by means of anchor sleeve 28 that is threadably interconnected between upper bushing 38 and upper expander 30.

Prior to detonation of the electric blasting cap that will initiate the setting process, the anchor assembly will typically be lowered below the setting point, if wellbore conditions allow, to check collars for accurate depth control. The anchor assembly will then be pulled upwardly with a constant stretch in the wireline cable and stopped at the desired position with the relevant lengths of the anchor assembly, setting tool, and whipstock having been used to calculate that the anchor assembly is positioned correctly for the exact depth, within inches, for the desired position of the casing window.

Upon detonation of a controlled and comparatively slow burning explosive within setting tool WSS, the setting tool begins to operate. The typical sequence of setting can be monitored on the wireline weight indicator at the surface assuming the depth and deviation of the wellbore is not too great. The line tension typically increases slightly after the explosive charge is electrically detonated and then, after about 5–10 seconds, suddenly drops off significantly when the weight of the anchor is detached from the setting tool by shearing of shear stud 20.

Essentially, setting tool WSS produces a relative downward movement of adaptor sleeve 16 with respect to anchor mandrel 22. Mandrel 22 is secured to lower expander 32. Adaptor sleeve 16 applies a downwardly directed force on upper expander 30 which is relatively movable with respect to lower expander 32. Therefore, upper expander 30 and lower expander 32 are forced to move relatively toward each other by operation of setting tool WSS. As lower expander 32 and upper expander 30 move relatively toward each other, upper and lower slips 24 and 36 are forced radially outwardly in a manner to be discussed hereinafter to engage casing C as shown generally in FIG. 2, and shown in an enlarged view in FIG. 15. The setting tool operation is completed when shear pin 20 breaks at weak point 21 as shown most clearly in FIG. 14. After shear pin 20 breaks to end the setting tool process, setting tool WSS or HSS may be retrieved upwardly towards the surface in the direction 75' as indicated in FIG. 2 through tubing T.

Figure 14:
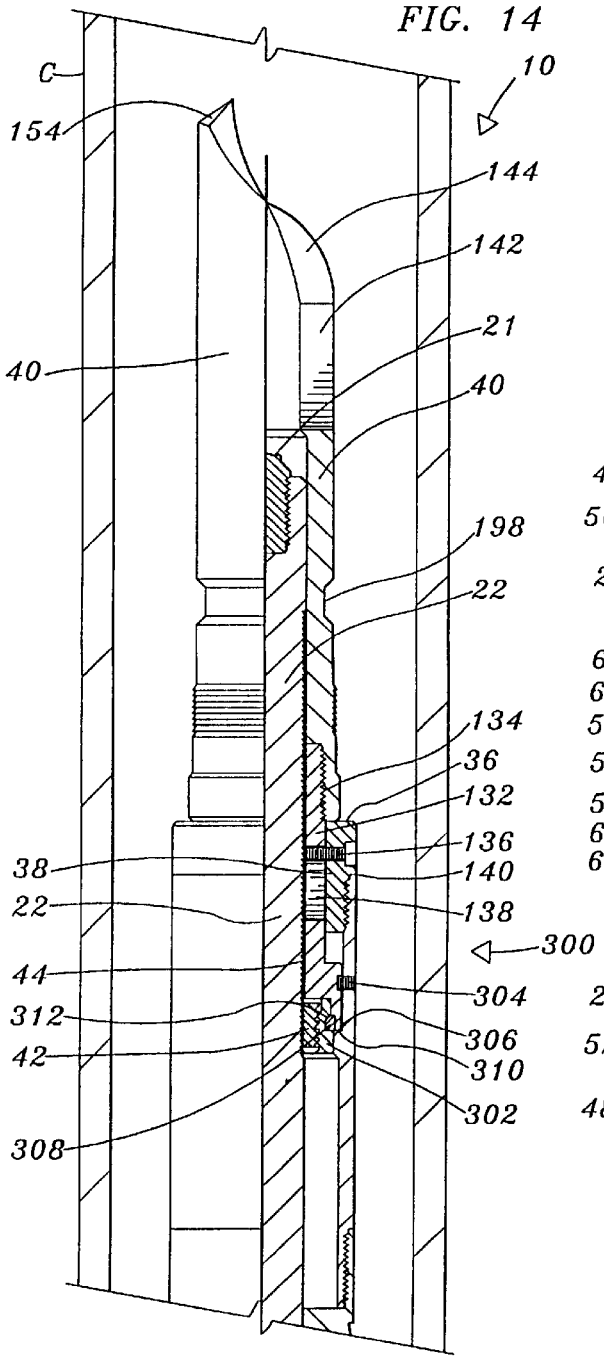
FIG. 14 is an elevational view, partially in section, showing the upper portion of the set anchor assembly of FIG. 12 with the anchor mandrel locked in position after the stud has been sheared.

It will be observed by comparison between FIG. 12 and FIG. 14 that anchor mandrel 22 has moved upwardly towards orientation mandrel 40 during the setting process. As well, shear stud 20 is broken or sheared at weak link 21 with a predetermined force that assures that the setting operation is completed. Upper and lower slips 24 and 26, respectfully, remain engaged against casing C after shearing of shear stud 20 because anchor mandrel 22 is secured in place by flexible ratchet ring 42. Flexible ratchet ring 42 thus engages mandrel ratchets 44 to prevent mandrel 22 from moving downwardly, with respect to upper and lower slips 24 and 26, after shear stud 20 is sheared so that the slips remain engaged with casing C.

Figure 15:
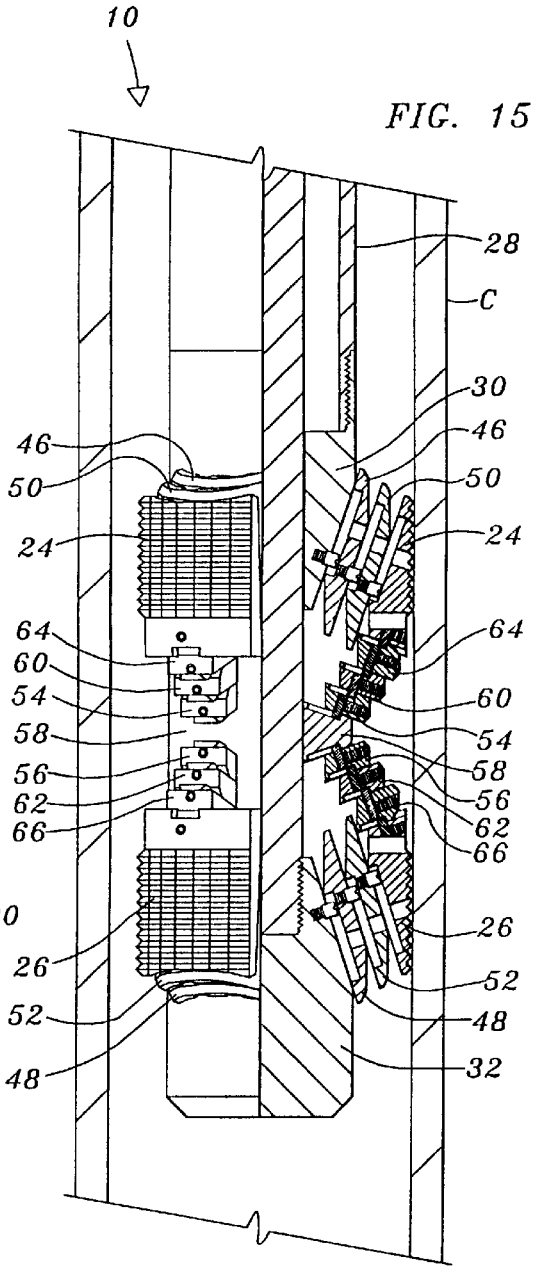
FIG. 15 is an elevational view, partially in section, showing the lower portion of the anchor assembly of FIG. 13 with the expanders, slip links, and casing slips in the expanded position to secure the anchor assembly with respect to the casing.

Upper and lower opposed slips 24 and 26, best seen in FIG. 15, are independently radially movable outwardly and inwardly. The slips are secured against casing C by means of relatively sliding members, discussed hereinafter, that slide upon each other in response to the relative movement of lower expander 32 in the direction of upper expander 30, to thereby force upper and lower slips 24 and 26 radially outwardly.

The uppermost and lowermost relatively sliding members will be referred to as upper and lower outer expanders, 46 and 48, respectively. Adjacent to these are upper and lower inner expanders, 50 and 52, respectively. Upper and lower inner expanders 50 and 52 are slidably secured to upper and lower slips 24 and 26, respectively, by a dovetail slotted key interconnection. Specifically, the relative slidable interconnections between each of the expanders as well as between the outer expanders and the slips may typically include two keys each having dovetail profiled cross sections. The keys are secured as with screws to the lower or radially inwardly side of each expander and each slip. The relative profile of the dovetail keyed slot interconnection is functionally similar to that of the interconnection between the slip links shown in FIG. 18 that is discussed hereinafter. The dovetail keys are secured within the upper and lower slots 53 and 55 shown in FIG. 13, respectively, that are provided between the expander and slip elements. The dovetail profile of mating keys and slots in combination with limit pins 74 within the limiting slots described below secure the expanders and slips together to thereby prevent relative disengagement of these components from each other. The dovetail keyed slot interconnection also allows relative substantially longitudinal or axial sliding movement between these components while preventing relative rotation of the expanders and slips about anchor 10 that might disturb the azimuthal orientation of the whipstock assembly.

Between upper and lower slips 24 and 26 are sets of respective slip links that are numbered in FIG. 15 where both a cross-sectional view and a perspective view of the slip links is available. Upper and lower inner slip links 54 and 56 are each slidably secured to slip cage 58. Upper and lower middle slip link 60 and 62, respectively, are slidably secured to the respective inner slip links. Upper and lower outer slip links 64 and 66, respectively, are slidably secured between the respective middlemost slip links and the respective upper and lower slips 24 and 26. Since they are all interconnected to the slip cage 50, the slip links assure substantively uniform radial outward movement of each of the circumferentially spaced upper slips 24 or lower slips 26, Since they are all interconnected to the slip case 56, the slip links ensure substantially uniform radial outward movement of each of the circumferentially spaced upper slips 24 or lower slips 26.

Due to their separate connection to slip cage 58, the upper and lower slip assemblies, that include the upper and lower expanders, the upper and lower slip links, and the separate upper and lower slips, function substantially independently from each other during setting and unsetting functions. Thus, lower slips 26 and upper slips 24 engage and disengage casing C independently from each other as lower expander 32 and upper expander 30 move toward or away from each other. This feature results in the reliable settings of the anchor slips such that the anchor central axis remains aligned with the axis of the casing. The independent disengagement of the slips also allows for the unsetting and retrieval of the anchor, as explained hereafter.

Figure 16:
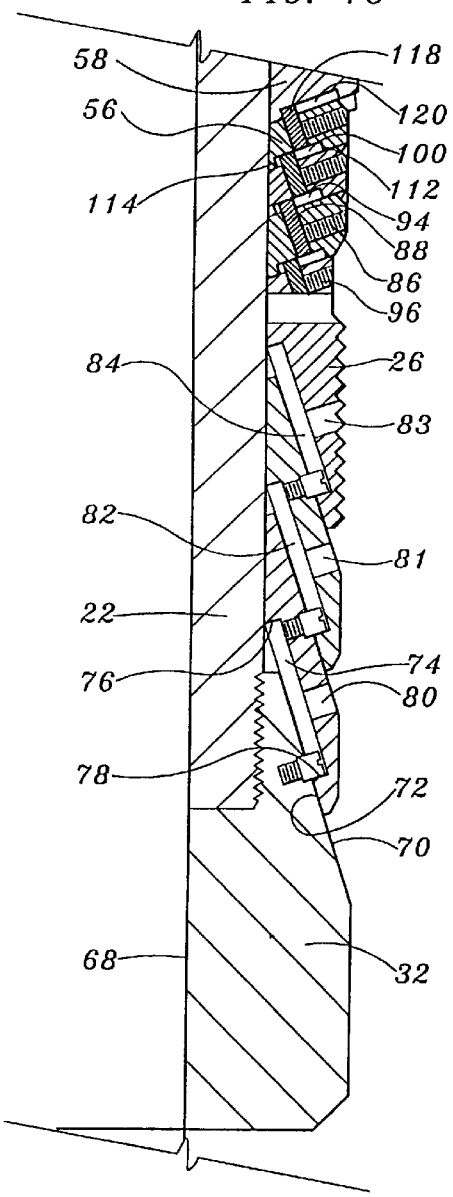
FIG. 16 is a quarter sectional view showing an enlargement of a lower portion of the anchor assembly with the expanders, slip links, and slips in a collapsed or retracted position.
Figure 18:
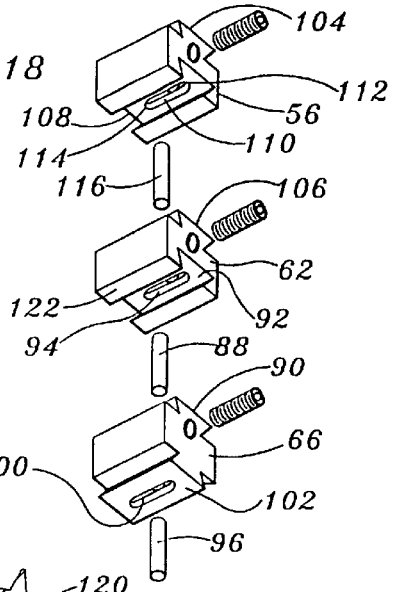
FIG. 18 is an exploded perspective view of the slip links in the lower portion of the anchor assembly of FIG. 17.
Figure 17:
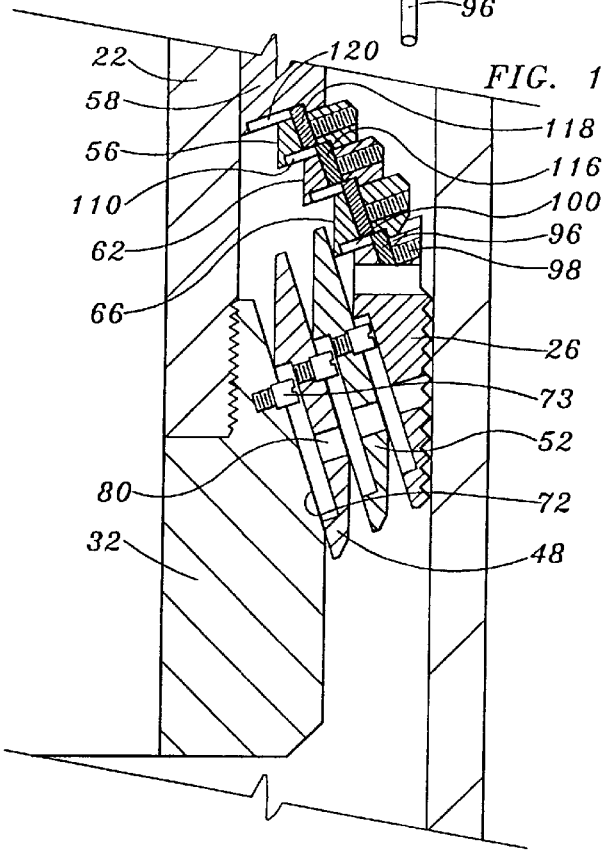
FIG. 17 is a quarter sectional view showing the lower portion of the anchor assembly of FIG. 16 with the expanders, slip links, and slips in the expanded position.
Figure 19:
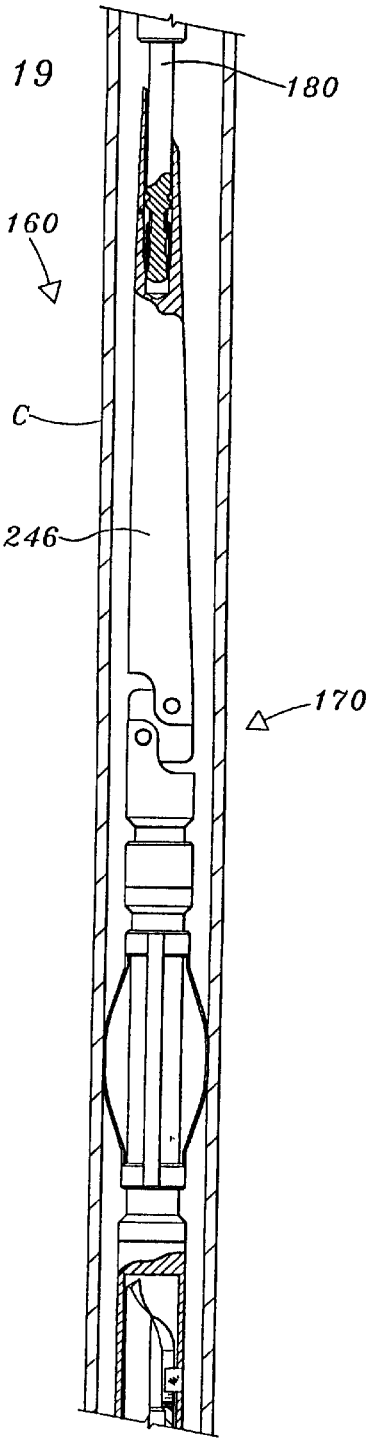
FIG. 19 is an elevational view, partially in section, showing the working string secured to the whipstock assembly after placing the whipstock hinge in the unset position during removal from the wellbore upon completion of the whipstock operation.

Referring now to FIGS. 16–18, further details of the lower slip components including lower expanders, slip links, and slips are disclosed. It will be understood that the construction of upper slip assembly components including expanders, slip links, sliding surfaces, and slips essentially mirrors the construction of the lower slip assembly components expanders, slip links, sliding surfaces and slips. For convenience, discussion of the lower slip assembly components thus also applies to the upper slip assembly components unless otherwise noted. FIG. 16 shows the lower slip assembly components in the unset or retracted position while FIG. 17 shows the lower slip engagement components in the set, position. FIG. 18 discloses the configuration of the slip links.

The expanders, slip links, and slips slide with respect to each other on surfaces that are angled or inclined with respect to the anchor center line 68 so that as lower expander 32 and upper expander 30 move towards each other, the expanders, slip links, and slips are wedged or urged radially outwardly towards casing C. The magnitude of the angle of the relative sliding surfaces of the upper and lower slip assemblies with respect to the anchor tool axis or centerline 68 is the same in the cross-section that includes the centerline 68 as shown FIG. 17 and FIG. 18. However, the orientation of measurement of the magnitude of the angle of the upper assembly sliding surfaces is taken from the axis beginning 180° out of phase as compared with the lower assembly sliding surfaces.

The construction of the inclined surfaces between the expanders is discussed in application Ser. No. 08/223,704 and is therefore only briefly reviewed here. The inclined, curved surfaces on the expanders are substantially parallel for each axially neighboring expander on the same slip assembly and are preferably of a continuous uniform radius or curvature. In other words, a cross-section perpendicular to anchor axis 68 through corresponding portions of axially neighboring expanders will show curved but parallel relative sliding surfaces. Vertical cross-sections of axially neighboring expanders as shown in FIG. 16 and FIG. 17 will show substantially straight and parallel relative sliding surfaces. See, for instance, sliding surfaces 82 and 84.

In cross-sections perpendicular to the central axis 68 of the tool, the circumferentially spaced sliding surfaces between the expanders lie along the circumference of a circle, and are not conical. Such a cross-section perpendicular to the anchor axis shows these surfaces lying on rounded lobes that would connect, for instance, in triangular fashion the three sets of circumferentially spaced lower slip assemblies. Because the expanders absorb large radial forces during setting and while the anchor is set, the expanders preferably collectively have a surface area that substantially extends around the circumference of anchor assembly 10 when in the collapsed position to minimize the radial force applied per square inch to the inner and outer surfaces of the expanders.

Lower expander inclined surface 70 on lower expander 32 engages mating outer expander surface 72 on outer expander 48. Limit groove 74 is disposed within outer expander surface 72 and, in conjunction with limit pin 73, limits the extent of sliding movement of outer expander 48. Limit groove 74 may be designed to limit movement of the outer expander both in the collapsed and expanded positions, as desired, by means of expansion limit shoulder 76 and collapsed limit shoulder 78.

Aperture 80 is provided through outer expander 48 to be in communication with limit groove 74 as a convenience during assembly for inserting limit pin 73. Likewise, apertures 81 and 83 are provided in inner expander 52 and lower slips 26 for similar assembly purposes.

Mating sliding surfaces, indicated generally at 82, are similarly provided between outer expander 48 and inner expander 52. As well, mating sliding surfaces, indicated generally at 84, are provided between inner expander 52 and lower slips 26.

Separate from and circumferentially spaced on either side of the respective limit grooves 74, 82, and 84 in the expander and slip elements are the dovetail keyed slots discussed hereinbefore. Representative dovetail slots 53 and 55 are shown in FIG. 13. The dovetail keyed slots also have sliding surfaces that correspond in orientation to the mating inclined surfaces disposed between the expanders.

The dovetail keyed slots and limit grooves in the slip links are essentially combined, as best shown in FIG. 17. In outer slip link 66, for instance, set screw 86 fixably secures limit pin 88 within outer slip link 66 through dovetail key 90. Dovetail key 90 interconnects with dovetail slot 92 in middle slip link 62 to slidably secure outer slip link 66 to middle slip link 62. Limit groove 94 is disposed within dovetail slot 92 to receive limit pin 88. Limit pin 88 and limit groove 94 cooperate to limit the extent of respective sliding movement between outer slip link 66 and middle slip link 62 as desired.

Limit pin 96 is secured to lower slip 26 by set screw 98 and is received into limit groove 100 to limit respective sliding movement between outer slip link 66 and lower slips 26. It will be noted that in this embodiment of the present invention, outer slip link 66 includes two dovetail keys, i.e. upper and lower dovetail keys 90 and 102, respectively. Inner slip link 56 and middle slip link 62 each have only one dovetail key. Thus, dovetail key 104 and dovetail key 106 are disposed on inner slip link 56 and middle slip link 62, respectively. Inner slip link 56 and middle slip link 62 also include dovetail slots 108 and 92, respectively whereas outer slip link has no dovetail slot. It should be understood that other configurations for placement and receipt of the dovetail slots and keys could be made.

Each limit groove, such as limit groove 110, includes expanded and collapsed position limit shoulders, such as respective limit shoulders 112 and 114, to thereby limit the relative movement by the slip assembly between the expanded and collapsed position. For this purpose, the limit shoulders engage a corresponding limit pin, such as limit pin 116, to thereby limit the extent of sliding movement between slip link 62 and slip link 56. Finally, inner slip link 56 is secured to cage 58 via dovetail key 104. Relative sliding movement between slip link 56 and cage 58 is limited by limit pin 118 (see FIGS. 16 and 17) that moves within limit groove 120.

Relative sliding between the cage, slip links, and the slips occurs along inclined surfaces that, in the presently preferred embodiment, have a slip link inclination that is substantially orthogonal to the inclination of sliding surfaces between the expander members and the slips. The expander inclination is shown, for example, in the cross-section of FIG. 16 and FIG. 17. Because the angle of inclination between the axis or centerline 68 of anchor assembly 10 and the expander inclination is much smaller than that of the slip link inclination, the expanders tend to absorb most of the forces that cause the slips to engage against casing C. The radial setting forces are quite large and are therefore better absorbed by the larger surface areas of the expanders as compared to the slip links. The expanders are disposed radially inwardly between the slips and the anchor assembly 10 when anchor assembly 10 is set. For instance, when anchor assembly 10 is set, lower expander 32 is beneath and radially inwardly with respect to outer expander 48, inner expander 52 and slip 26 to thereby support the radial forces.

Because the forces to be absorbed by the slip links tend to be axially directed rather than radially directed, the sliding surfaces of the slip links may be conveniently substantially flat rather than radiused. The slip links may be axially spaced from the slips whether in the set or unset position because they do not transmit substantial radial forces. The side portions of all the dovetail keys and slots on all slip assembly components including cage 58, the slip links, upper and lower slips 24 and 26, and the expander members, tend to absorb most of the rotational forces that act on anchor assembly 12 to prevent rotation thereof with respect to casing C. It is necessary to avoid rotation of anchor assembly 12 during the milling and drilling operation that will result in torque and weight being applied to anchor assembly 10.

Figures 23, 24:
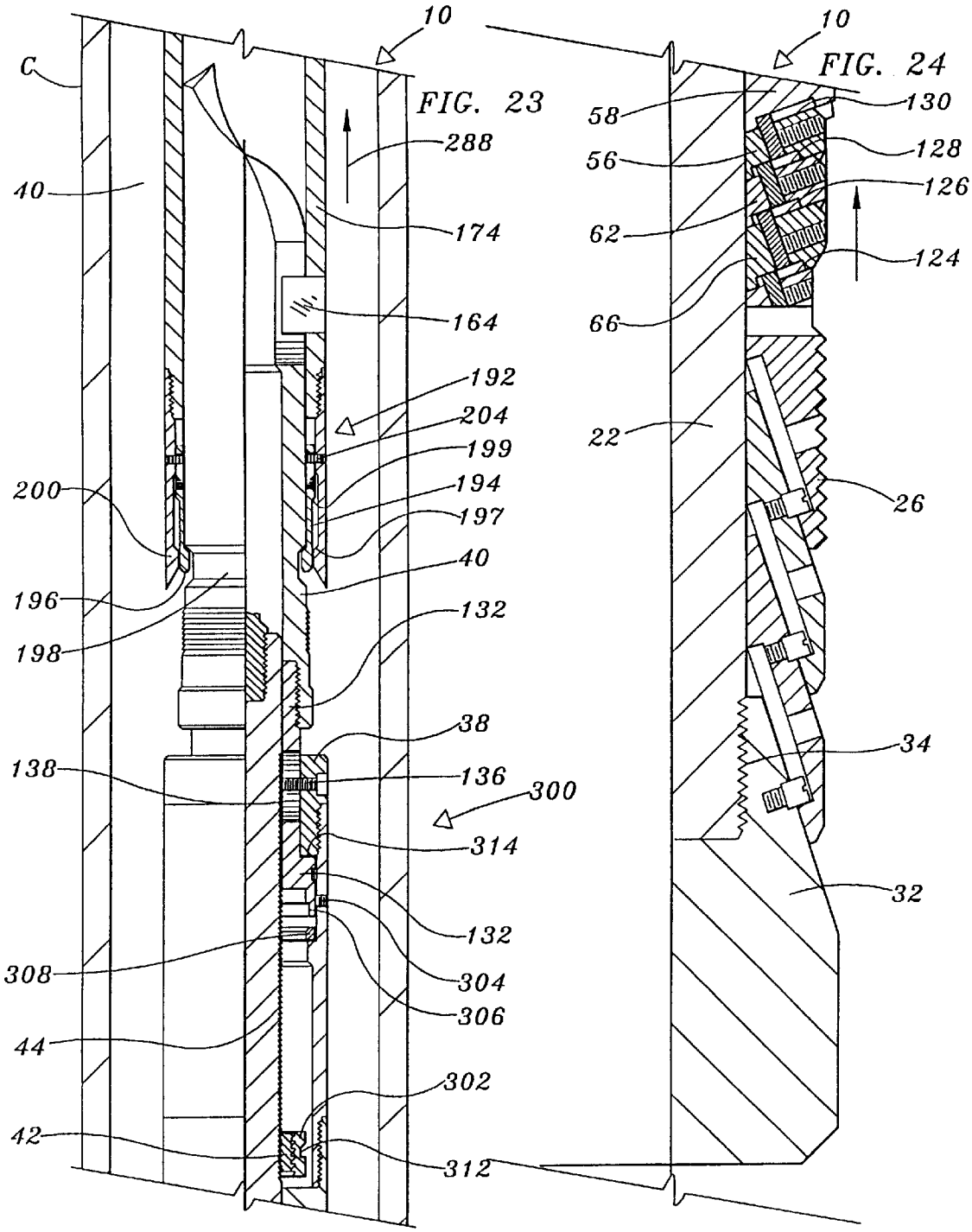
FIG. 23 is an elevational view, partially in section, of the whipstock and anchor assembly after the ratchet lock for the anchor mandrel has been released to allow removal of the anchor assembly from the wellbore through the tubing.
FIG. 24 is a quarter sectional view of a lower portion of the anchor assembly in a collapsed or retracted position to allow removal of the anchor assembly from the wellbore through the tubing.

The sliding surfaces of the lower slip links and related surfaces on cage 58 and lower slips 26 are preferably parallel to each other and, in the presently preferred embodiment, include surfaces on the dovetail slots and keys, as discussed hereinbefore, as well as surfaces adjacent thereto. By way of example, such surfaces also include surfaces 122 on either side or dovetail slot 92 on middle slip link 62 that are substantially parallel to sliding surfaces on the bottom of dovetail slot 92. Referring to FIG. 24, such relative mating surfaces also include dovetail keyed slot engagement surfaces such as mating surfaces 124 between lower slip 26 and outer slip link 66, mating surfaces 126 between outer slip link 66 and middle slip link 62, mating surfaces 128 between middle slip link 62 and inner slip link 56, and mating surfaces 130 between inner slip link 56 and cage 58.

As shown in FIG. 2, after the anchor assembly 10 is set and the setting tool removed from the wellbore, the orientation mandrel 40 secured to the upper portion of anchor 10 is exposed. As shown in the enlarged view of FIG. 14, orientation mandrel is fixably secured to release sleeve 132 via threaded connection 134 to butt against shoulder 36 of upper bushing 38. As will be noted, release sleeve 132 is prevented from rotation by set screw 136 and slot 138. Set screw 136 extends into slot 138 through upper bushing 38, that is screwed down to butt against shoulder 140 on anchor sleeve 28 to prevent further rotation thereof. Thus, the orientation mandrel cannot rotate after the anchor assembly is set.

The orientation mandrel 40 includes an orientation slot 142 into which will be received and orientation lug as discussed hereinafter. As well, an inclined guide surface 144 along the upper portion of orientation mandrel 40 slopes downwardly toward orientation slot 142 to guide the orientation lug into the orientation slot 142. Retention groove 198 cooperates with a latch mechanism to secure the whipstock assembly to anchor assembly 10 as discussed hereinafter.

Referring to FIG. 3, directional survey tool 146 is lowered by wireline 12 onto orientation mandrel 40. Directional survey tool 146 includes an survey sleeve 148 that telescopes over orientation mandrel 40 as directional survey tool 146 descends through casing C. Orientation lug 150 is fixably secured within survey sleeve 148. Thus, as survey sleeve 148 descends over orientation mandrel 40, orientation lug 150 engages guide surface 144 that guides orientation lug 150 into orientation slot 142. Although directional survey tool 146 preferably include centralizers 152, the centralizers are mounted in such a way that the directional survey tool is substantially free to rotate to allow orientation lug 150 to be guided into orientation slot 142.

It will be noted that several features guide survey sleeve 148 over orientation mandrel 40 to prevent it from becoming cocked or otherwise improperly engaging orientation mandrel 40. This is particularly important for operation in a deviated well bore. Due to the fact that it may be impossible to immediately ascertain from the surface whether survey sleeve 148 correctly engages orientation mandrel 40, it is desirable to provide means to ensure proper engagement. Various means are thus used for this purpose, including centralizers 152 that centralize directional survey tool 146 within casing C to thereby guide survey sleeve 148 over orientation mandrel 40. As well, beveled end 152 or survey sleeve and beveled end 154 of orientation mandrel 40 engage to guide survey sleeve 148 over orientation mandrel 40. After directional survey tool 146 collects the information as to the radial azimuthal orientation of orientation slot 142, the directional survey tool is removed from the hole by wireline 12.

The directional survey tool provides information as to the azimuthal orientation of orientation slot 142. With this information, the face of the whipstock assembly can be correctly oriented on the surface with respect to a second orientation lug that is provided on the whipstock assembly. The manner or making this surface orientation adjustment involves separating and reconnecting a spline-groove connection between the whipstock face and the whipstock alignment lug based on the survey information that provides the azimuth of orientation slot 142. Once adjusted, the spline-groove connection is locked together. The number of splines and grooves determines the resolution of the accuracy to which the whipstock face can be oriented. For instance, 72 orientation positions would provide a 5° resolution.

It will be understood that whipstock assembly 160 is properly oriented at the surface so that when alignment lug 164 engages orientation slot 142 as shown in FIG. 4, then whipstock face 162 is oriented to guide a mill, as discussed hereinafter, in the desired azimuthal radial direction for the casing window. The spline-groove connection may be contained in quick change connection 166. Whipstock face 162 cannot rotate with respect to whipstock alignment lug 164 once quick change connection 166 is made up. Thus, after the whipstock assembly orientation is accomplished on the surface, then whipstock assembly 160 is lowered through the bottom of tubing T into casing C using working string 168.

Whipstock assembly 160 further includes hinge assembly 170 that, in the set position, supports the base portion of whipstock assembly 160 within casing C, as discussed hereinafter. In the unset position, hinge assembly 170 streamlines the profile of whipstock assembly 160 so that it will have an outer diameter smaller than the inner diameter of tubing T.

Centralizer 172 is mounted above whipstock orientation sleeve 174 to centralize and therefore guide whipstock orientation sleeve 174 over orientation mandrel 40 in telescoping relationship as discussed hereinbefore with regard to directional survey tool 146. Whipstock orientation sleeve 174 is very similar to and, for engagement purposes, substantially identical to survey tool orientation sleeve 148. Centralizer 172 is connected to centralizer sub body 176 by means of upper and lower rotatable rings 178 so as not to restrict free rotation of whipstock assembly 160 in casing C. Thus, as whipstock alignment lug 164 engages inclined guide surface 144 on orientation mandrel 40, whipstock assembly 160 is substantially free to rotate in casing C until alignment lug 164 is guided to slide into orientation slot 142. The weight of whipstock assembly 160 and workstring 168 produces a considerable torque for rotating whipstock assembly 160 to thereby position whipstock alignment lug 164 into orientation slot 142 as whipstock alignment lug 164 slides downwardly on inclined guide surface 144.

Whipstock assembly 160 may be secured to working string 168 with adaptor 180 that stabs into adapter receiving hole 181 through the top 183 of whipstock assembly 160. Adaptor 180 includes at least one shear pin 182 as best shown in the enlarged view of FIG. 5. Shear pin 182 supports the entire weight of whipstock assembly 160 as the assembly is lowered into the wellbore. Shear pin 182 is installed into annular groove 184 that encircles adaptor 180 through shear pin threaded hole 186 in whipstock assembly 160. Thus, whipstock assembly 160 may rotate with respect to adaptor 180 and working string 168 as shear pin 182 moves in annular groove 184 for orientation of whipstock assembly 160.

Figure 20:
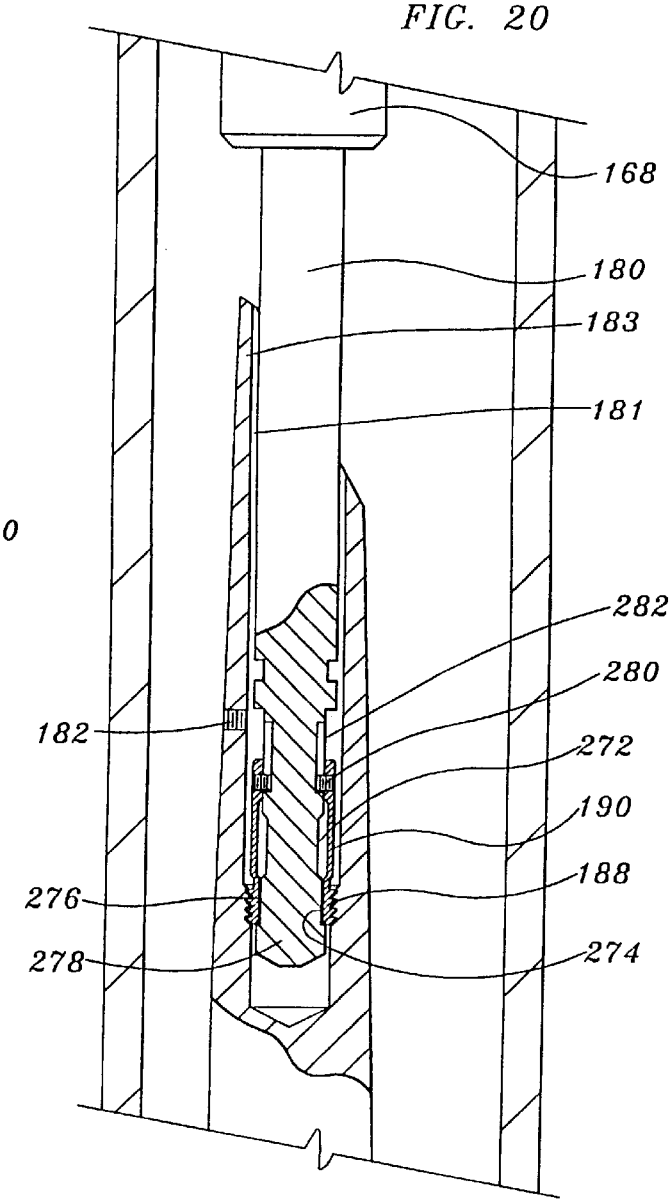
FIG. 20 is an elevational view, partially in section, showing an enlargement of the working string connection including a grapple for removal of the whipstock assembly.

After securing whipstock assembly 160 to anchor assembly 10 and setting whipstock hinge assembly 170 as discussed hereinafter, working string 168 may be removed by shearing shear pin 182 with an upward pull. Adaptor end surface 187 may be used to apply downwardly directed pressure on whipstock assembly 160 for attaching anchor assembly 10 thereto and also for setting hinge assembly 170. Adaptor receiving hole 181 also includes retrieving threads 188 to retrieve whipstock assembly 160 as discussed hereinafter. The same adaptor 180 may be fitted with retrieval grapple 190, as best shown in FIG. 20.

Figure 7:
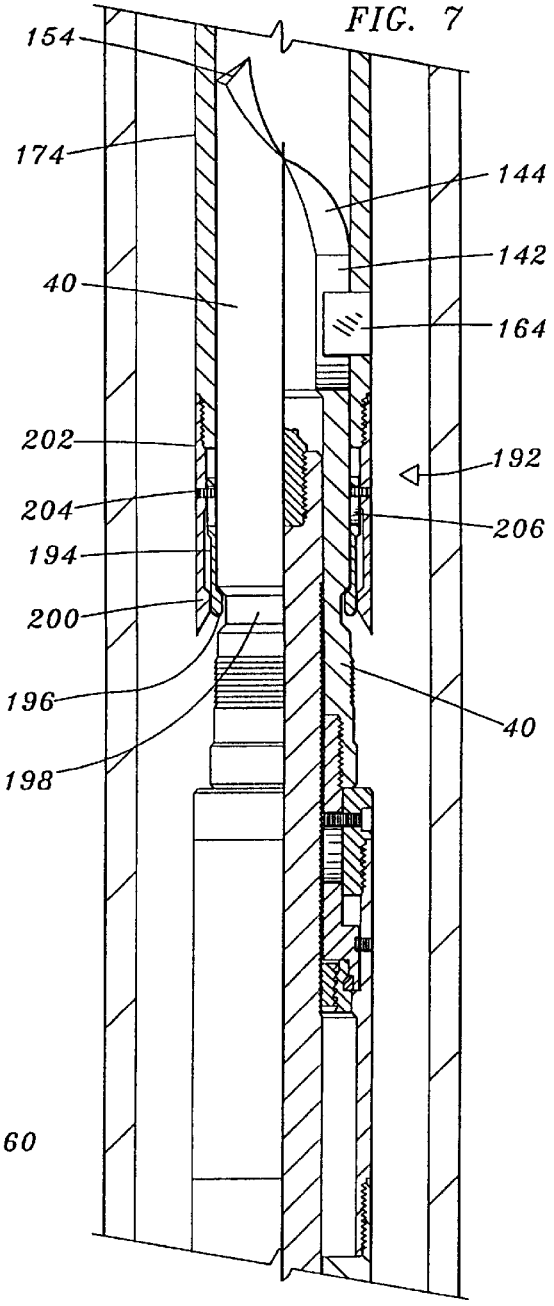
FIG. 7 is an elevational view, partially in section, of a latch connection to secure the whipstock assembly to the anchor assembly.

FIG. 7 discloses an interconnection assembly 192 in accord with the presently preferred embodiment for interconnecting whipstock assembly 160 with anchor assembly 10. Individual circumferentially spaced fingers such as finger 194 are moved upwardly and flexed outwardly from orientation mandrel 40 of anchor assembly 10 as whipstock assembly 160 is lowered thereon until inward projection 196 on the end of each finger 194 engages retention groove 198 on orientation mandrel 40. Upward movement of whipstock assembly 160 moves finger support 200 that is disposed on end portion 202 of whipstock orientation sleeve 174 adjacent inward projections 196 in retention groove 198 to thereby interconnect whipstock assembly 160 with anchor assembly 10. Due to pins, such as pin 204 that is secured to end portion 202 and extends into groove 206, end portion 202 may move downwardly with respect to finger 194 to provide additional support for anchor sleeve 174 as finger supports 200 also engage retention groove 196. When anchor assembly 160 is lifted upwardly, pins 204 releasably support the tension required for unsetting and retrieving anchor assembly 10.

Figure 6A:
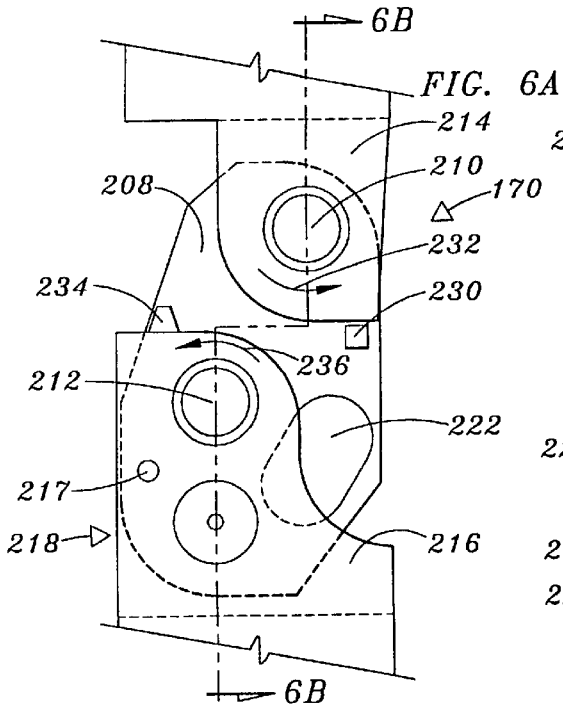
FIG. 6A is an elevational view showing an enlargement of the hinge portion of the whipstock assembly of FIG. 4 in an unset position for lowering the whipstock assembly through the tubing.
Figure 6B:
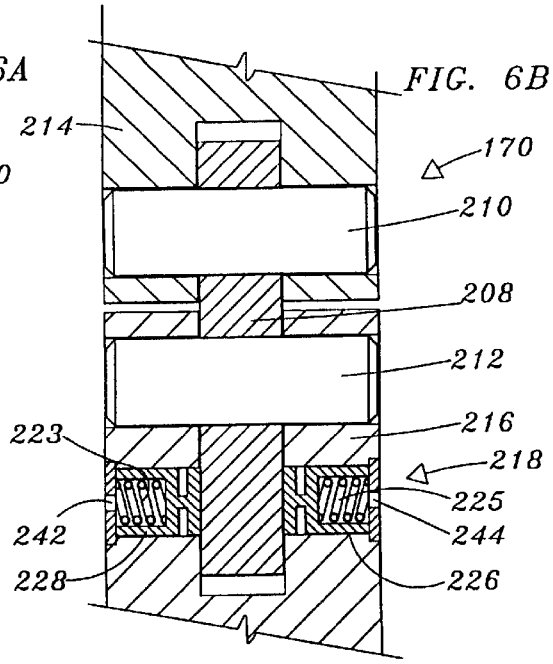
FIG. 6B is an elevational view, partially in section, of the hinge portion of FIG. 6A along the line 6B—6B.
Figure 6C:
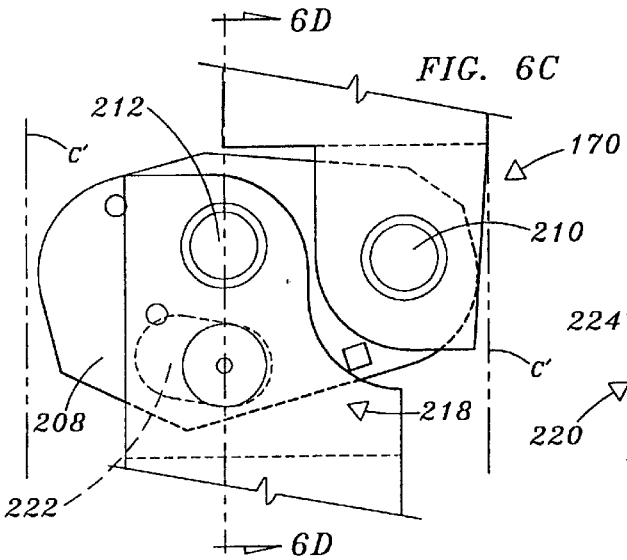
FIG. 6C is an elevational view showing the hinge portion of the whipstock assembly of FIG. 6A after being placed in a set position.
Figure 6D:
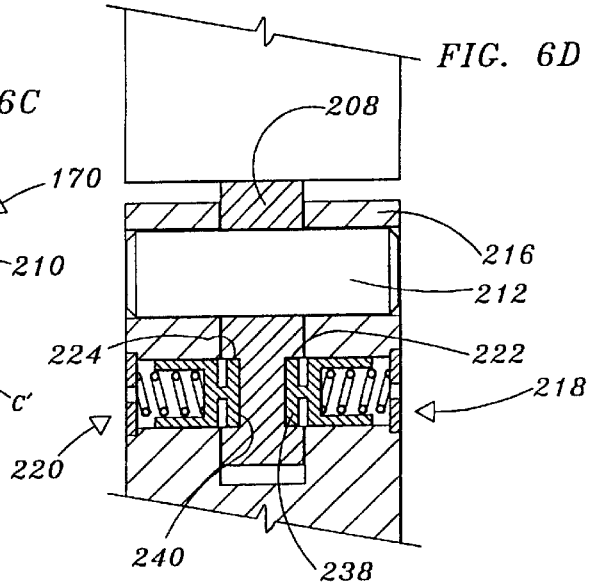
FIG. 6D is an elevational view, partially in section, of the hinge portion of FIG. 6C along the line 6D—6D.

FIG. 8 shows hinge assembly 170 in the set position. The process of setting hinge assembly 170 is illustrated in FIGS. 6A–6D that provide enlarged views of hinge assembly 170. FIG. 6A and FIG. 6B show hinge assembly 170 in the unset position. FIG. 6C and FIG. 6D show hinge assembly 170 in the set position.

In general terms, when weight is applied to whipstock assembly 160 by means of working string 168, hinge block 208 rotates with respect to upper and lower offset hinge pins 210 and 212, respectively, thereby placing hinge assembly 170 in the set position.

Hinge block 208 is secured between the forks of both upper fork 214 and lower fork 216. Upper offset hinge pin 210 extends through upper fork 214 and hinge block 208 to thereby rotatably secure hinge block 208 for relative rotation within upper fork 214. Lower offset hinge pin 212 extends through lower fork 216 and hinge block 208 for relative rotation within lower fork 216. Shear pin 217 maintains hinge assembly 170 in the unset position to maintain the small diameter unset position of whipstock assembly 160 for moving downwardly through smaller diameter tubing T. Weight applied to hinge assembly 170 by working string 168 shears shear pin 217 and moves hinge assembly to the set position.

Lower fork 216 contains therein locking means to lock hinge assembly 170 in the set position. This locking mechanism includes two spring-loaded shearable pin assemblies 218 and 220 for engaging corresponding lock sockets 222 and 224, respectively, that are disposed on opposite sides of hinge block 208. Thus, as hinge block 208 rotates relative to upper and lower forks 214 and 216, respectively, from the unset position as shown in FIG. 6A to the set position as shown in FIG. 6C, spring loaded shear pins 226 and 228 engage respective lock sockets 222 and 224 to thereby lock hinge assembly 170 in the set position, as shown most clearly in FIG. 6D. Lock sockets 222 and 224 are preferably somewhat extended or elongate to be larger than the spring loaded shear pins so that hinge assembly 160 can adjust to a certain extent for hole size while in the locked position. Springs 223 and 225 provide the biasing means for the spring loaded shear pins.

Upper fork 214 rotates in the direction or upper rotation direction arrow 232 to move hinge assembly 170 to the set position from the unset position. Upper limit pin 230 extends into hinge block 208 and abuts the lower adjacent end of upper fork 214 to prevent relative rotation around upper offset hinge pin 210 in the opposite direction, when locking assembly 170 is in the unset position.

Lower fork 216 rotates in the direction of lower rotation direction arrow 236 to move hinge assembly 170 to the set position from the unset position. Similarly, lower limit pin 234 extends into hinge block 208 and abuts the upper adjacent end of lower fork 216 to prevent relative rotation around lower offset hinge pin 212 in a direction opposite that of lower direction arrow 236 when locking assembly 170 is in the unset position.

To effect retrieval of whipstock assembly 160, shearable ends 238 and 240 of respective spring loaded shear pins 226 and 228 are sheared off, in a manner discussed hereinafter. In some cases, it may be desired to use a screw (not shown) extending through each of holes 242 and 244 to engage the respective spring loaded pins to prevent actuation during transport until final assembly for operation.

Referring now to FIG. 8, after placing hinge assembly 170 in the set position, working string 168 may be retrieved. Setting of hinge assembly 170 expands base region 248 of whipstock member 246 to support whipstock member 246 during the milling operation. Whipstock member 246 may, if desired, have a casing engaging contour 250 and another casing engaging contour 252 that engage casing C over a longer length when hinge assembly 170 is set to thereby better more evenly disperse milling and drilling forces applied thereto. Whipstock face 254 is preferably concave for receiving and guiding a window mill 266.

Figure 9A:
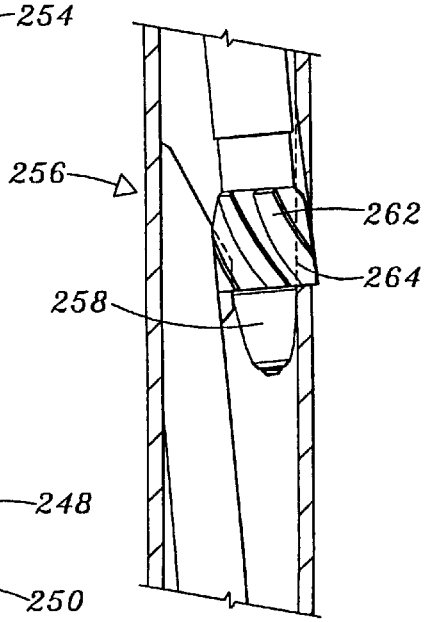
FIG. 9A is an elevational view, partially in section, showing the starter mill of FIG. 9 having partially milled through a portion of the casing.
Figure 9:
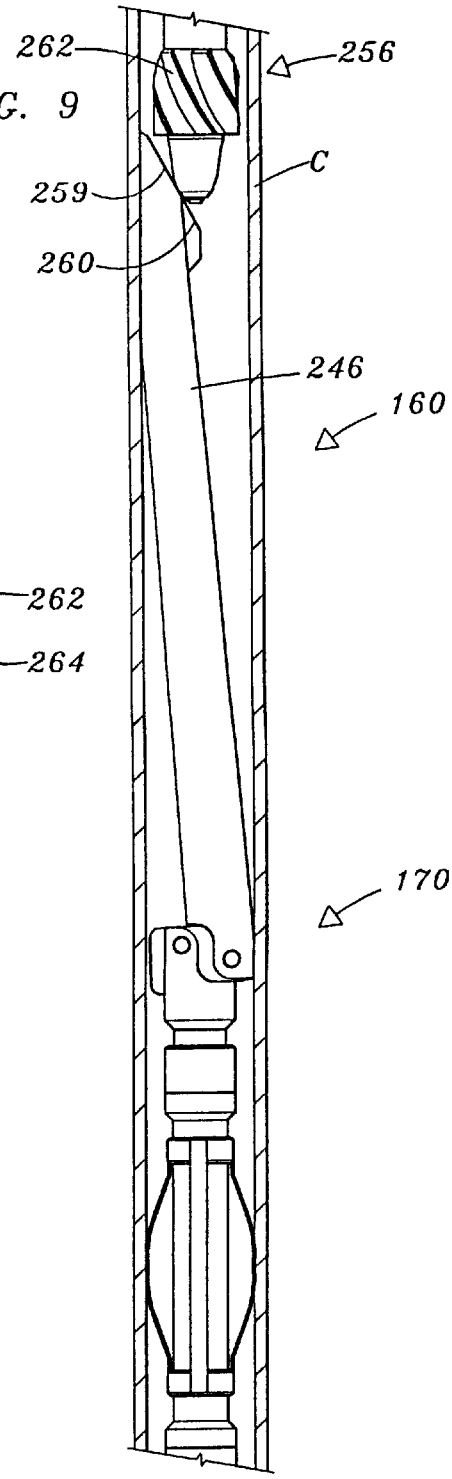
FIG. 9 is an elevational view, partially in section, showing a starter mill having a nose member positioned to engage a ramp on the whipstock assembly for initiating the milling operation to cut a window in the casing.

In FIG. 9, starter mill 256 is shown. A stater mill may preferably be used to initiate the milling operation. Starter mill 256 includes a nose or pilot portion 258 to engage ramp 259 that preferably includes ramp extension 260. Nose or pilot portion 258 and ramp extension or pilot lug 260 cooperate to position mill blades 262 against casing C and initiate cutting the casing window as shown in FIG. 9a. Otherwise, the mill may have a tendency to mill out the whipstock member 246 without opening casing window 264 as desired. As well, mill blades 262 are not as deep as mill blades used with a full bore mill operation because the mill must have an O.D. smaller than the I.D. of the smallest restriction in tubing string T. Nose portion 258 may be fixed or rotatable with respect to mill blades 262 as desired to eliminate wear on nose portion 258. Ramp extension member 260 may be partially milled off during the milling operation. Nose portion 258 will preferably be designed to wedge and thereby stop milling once the cutting of casing window is successfully initiated.

Figure 10:
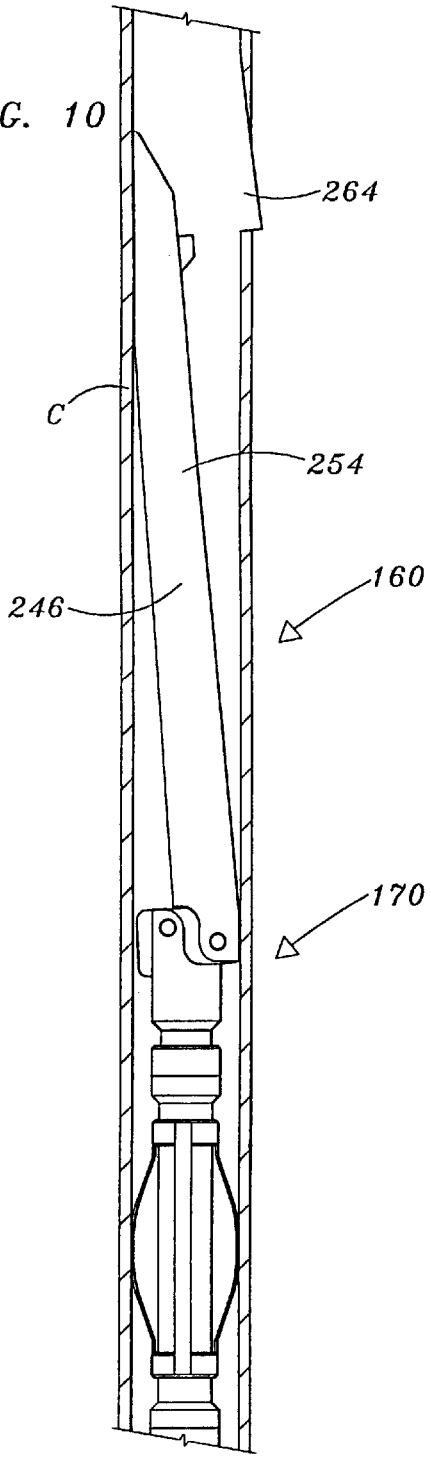
FIG. 10 is an elevational view, partially in section, showing an incipient stage of the milling operation after the starter mill of FIG. 9 has been removed and prior to replacement thereof by a window mill or other type of mill to complete the milling operation.
Figure 11:
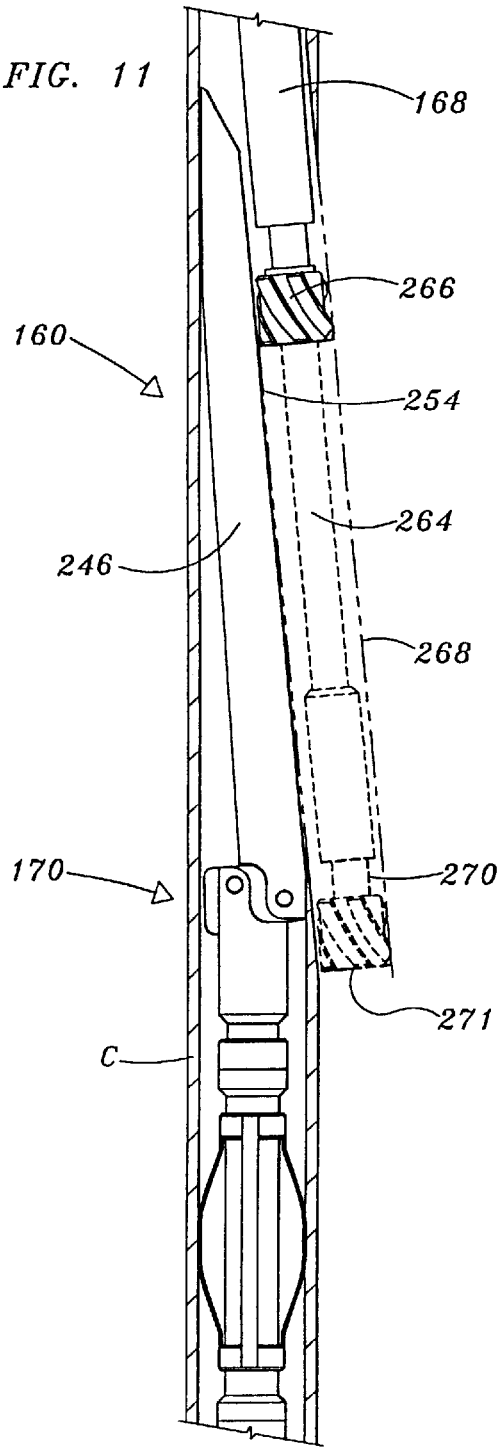
FIG. 11 is an elevational view, partially in section, showing a window mill positioned along the trough or face of the whipstock for continuing the milling operation along the dotted line projecting the path of the mill.

As indicated in FIGS. 10 and 11, the starter mill is preferably removed after the milling operation is initiated to penetrate the casing and is replaced with a window mill 266 to continue the milling operation as indicated in dashed lines in FIG. 11 as projected wellbore 268 and mill assembly 270. Various other mills may be used as wellbore 268 is deepened, including string mills or tapered mills to clean up casing window 264. After the wellbore is sufficiently deep, a conventional bottom hole assembly may be provided on working string 168 to deepen wellbore 268 to the desired bottom or TD 271.

After the new wellbore is completed, it may be desirable to be able to remove the whipstock assembly from the original borehole. FIG. 20 shows an enlargement of the assembly used to stab into the whipstock assembly shown in FIG. 19. To retrieve whipstock assembly 160, retrieval grapple 190 is secured to adaptor 180 and adaptor 180 is secured to the end of working string 168, run into casing C, and stabbed into adaptor receiving hole 181 in whipstock top 183. Recess 272 in adaptor 180 allows grapple blade portion 274 to engage retrieving threads 188 as adaptor 180 moves downwardly. Subsequently, as adaptor 180 is pulled upwardly, the larger diameter of backup sockets 276 prevent disengagement of grapple blade portion 274 and retrieving threads 188. Retrieval grapple 190 moves relatively with respect to adaptor 180 due to grapple pins 280 moving in slots 282. The arrangement of grapple pins 280 within slots 282 also maintains grapple blade portion 274 in nonrotational relationship with backup sockets 276. Bottom shoulder 278 pulls upwardly to engage the bottom of retrieval grapple 190 while pins 280 prevent further relative movement between adapter 180 and pins 280. Thus, working string 168 is secured to whipstock assembly 160 to retrieve it from casing C with an upwardly pull as discussed hereinafter. If for any reason whipstock assembly 160 cannot be retrieved, the left-hand retrieving threads 188 permit disengagement of adaptor 180 from whipstock assembly 160 upon application of right-hand torque to the workstring 168.

Figure 21:
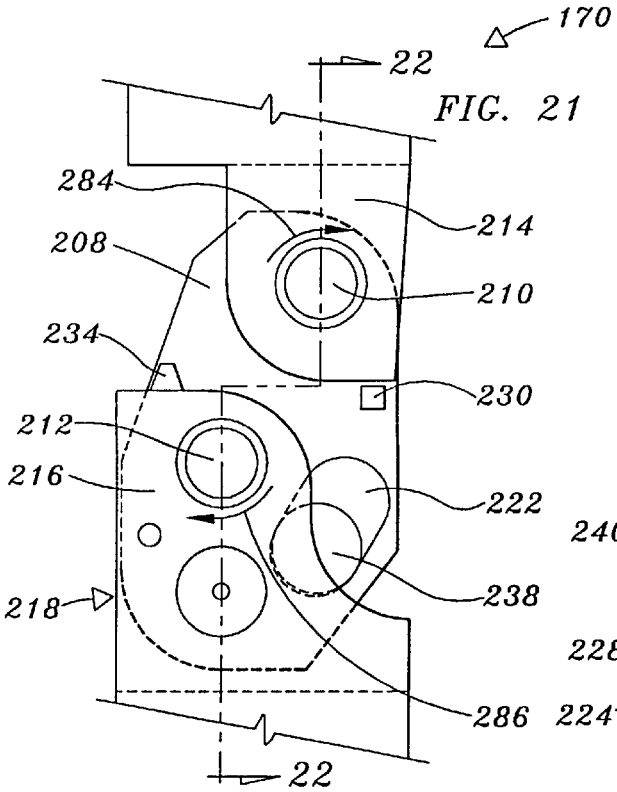
FIG. 21 is an elevational view showing the hinge portion of the whipstock assembly after being returned to the unset position for removing the whipstock assembly from the wellbore through the tubing.
Figure 22:
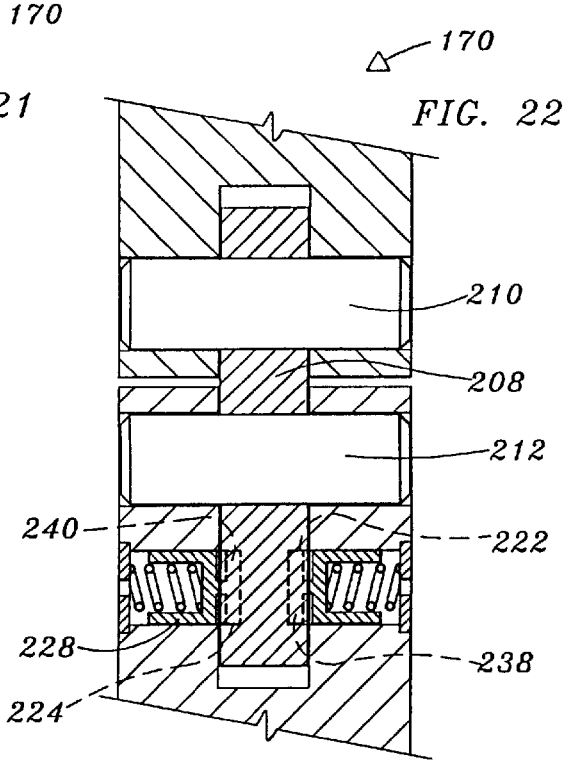
FIG. 22 is an elevational view, partially in section, of the hinge portion of FIG. 21 along the line 22—22.

Referring now to FIGS. 21 and 22, the process for placing hinge assembly 170 in the unset position to thereby allow whipstock assembly 160 to be removed from the wellbore through a smaller diameter tubing T is illustrated. Thus, pulling upwardly on hinge assembly 170 causes shearable ends 238 and 240 of spring loaded shear pins 226 and 228 to shear off.

Figure 5:
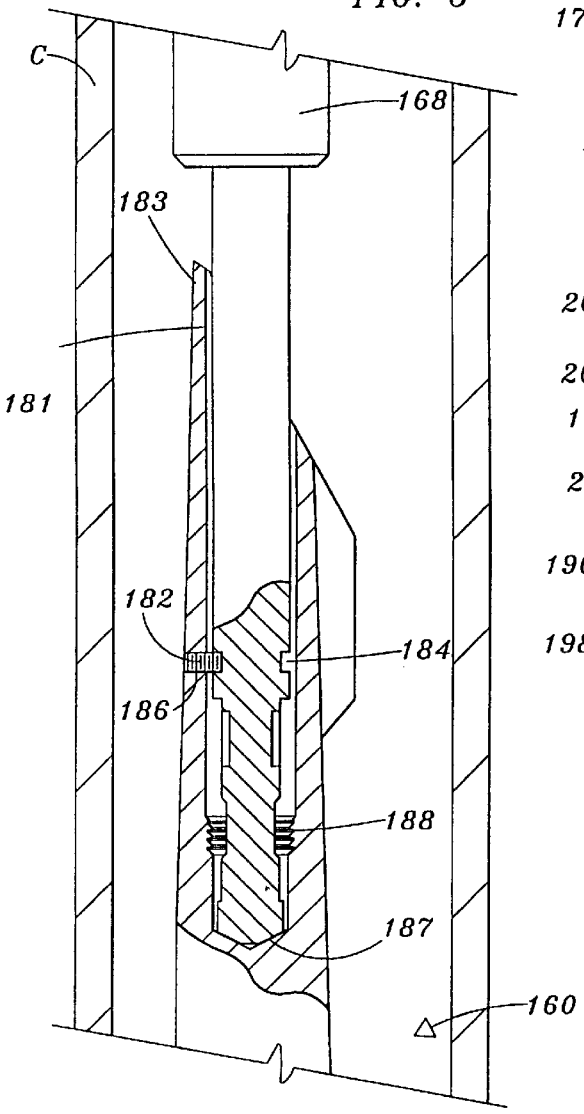
FIG. 5 is an elevational view, partially in section, showing an enlargement of the working string connection to the whipstock assembly of FIG. 4.

It will be noted that shear pin 182 discussed hereinabove and shown in FIG. 5 is used to separate working string 168 from whipstock assembly 160 after initially placing hinge assembly 170 in the set position. Shear pin 182 must therefore be sized to shear with an upward pull or tension less than the upward pull or tension required to shear shearable ends 238 and 249 to place hinge assembly 170 back into the unset position for retrieval from the wellbore through the smaller diameter tubing T. Upper and lower unsetting direction arrows 284 and 286 indicate the relative rotation direction of upper fork 214 around upper offset hinge pin 210 and lower fork 216 around lower offset hinge pin 212. Limit pins 230 and 234 prevent further rotation in this direction as discussed hereinbefore. In this manner, the outer diameter of whipstock assembly 160 is contracted to a smaller diameter that allows it to fit through a smaller diameter tubing T.

Referring now to FIG. 23, the procedure for unsetting anchor assembly 10 is illustrated. Additional upward pull applied in the direction of arrow 288 on whipstock assembly 170 is also effectively applied to anchor assembly 10 through interconnection assembly 192. More specifically, the upward pull creates an upwardly directed force acting acting on orientation mandrel 40 to which interconnection assembly 192 is secured by means of fingers 194 having inward projections 196 that engage retention groove 198.

This upward force on orientation mandrel 40 causes ratchet lock assembly 300 to release. FIG. 14 shows ratchet lock assembly 300 in the locked position after setting, while FIG. 23 shows ratchet lock assembly 300 after release has been effected. Operation of ratchet lock assembly 300 is similar to that of an exemplary ratchet release system shown in U.S. Pat. No. 4,898,245 that is incorporated herein by reference.

Releasable ratchet lock assembly includes flexible ratchet ring 42 which engages outer ring 302. Lock ring 308 surrounds outer ring 302. Shear screw 304 secures releasing sleeve 134 in its axial position with respect to upper bushing 38. Lock ring 308 is prevented from moving downwardly, or axially away from upper bushing 38, by ledge 310. Lock ring 308 engages groove 312 in outer ring 302 to thereby prevent axially downward movement away from upper bushing 38 of flexible ratchet ring 42, thereby locking anchor mandrel 22 in fixed axial position with respect to upper bushing 38. However, as orientation mandrel 40 is pulled upwardly under sufficient tension, then shear screw 304 is sheared and release sleeve 132 is free to move axially towards upper bushing 38. This causes support wall 306 on the end of release sleeve 132 to move upwardly and allow lock ring 308 to expand radially outwardly. Without lock ring 308 to prevent axially downward movement of segmented ratchet ring 42, anchor mandrel 22 is free to move downwardly to release the setting tension forces acting on it. With anchor mandrel 22 free to move, upper expander 30 may now move away from lower expander 32 to unset the upper and lower slip assemblies.

Release sleeve 132 moves upwardly in response to upward force applied by working string 168 until it engages lower shoulder 314 of upper bushing 38. Referring to FIG. 15, upwardly directed force is applied to upper expander 30 through anchor sleeve 28. Relative sliding, in a direction opposite of movement caused by the setting operation, between upper slip assembly components including the upper expanders and upper slip links causes upper slip 24 to move radially inwardly. As discussed hereinbefore, the use of slip cage 58 slidably secured to anchor mandrel 22 allows the upper slip 24 to move independently of opposing lower slip 26.

Continued upwardly directed force on cage 58 produces a radially inwardly directed force on the lower slip assembly components to release lower slips 26. Gravity and momentum forces acting on mandrel 22 and lower expander 32 also cause lower expander 32 to move relatively away from upper expander 30 to release lower slips 26. Thus, slip assembly components contract to the position shown in FIGS. 13 and 24. With the outer diameter of anchor 10 contracted to the same as the original outer diameter, anchor 10 can now move through the smaller inner diameter of tubing T. Since whipstock assembly 160 and anchor assembly 10 are secured together by interconnection 192 as shown in FIG. 7, whipstock 160 and anchor 10 can now be simultaneously removed from casing C through tubing T.

It should be understood that the whipstock assembly 160 may alternatively be retrieved to the surface while leaving the anchor assembly 10 secured to the casing C. For this embodiment, the shear pin 204 is sized to shear prior to pin 304. Upward tension on orientation sleeve 174 thus shears pin 204 (see FIG. 23) allowing the upper surface 197 on finger supports 200 to engage the mating downwardly projecting surface 199 on fingers 194. This movement releases the finger 194 to flex outward, thereby releasing the orientation sleeve 174 from the mandrel 40. If the anchor is to be retrieved with the whipstock assembly, the pin 204 is sized to be stronger than pin 304 in the anchor. In this case, pin 304 will shear while pin 204 remains intact, allowing the anchor to be retrieved with the whipstock.

While the foregoing is the presently preferred embodiment of the present invention, numerous changes could be made as desired. For instance, if desired, a setting mechanism such as a hydraulic or mechanical setting mechanism could be built into the anchor. Also, a whipstock assembly that includes an anchor could be set with a working string. If desired, whipstock assembly 160 could be removable from mandrel 40 and anchor assembly could be separately retrieved with grapple thread 316 as shown in FIG. 12. The relative angles or the sliding surfaces may be changed as desired. Additional sliding surfaces may be added or removed to either extend or decrease the expansion range of the slips of anchor assembly 10.

Typically, the range of difference between the outer diameter of the inner tubular, such as tubing string T, and inner diameter of the outer tubular, such as casing C, will be at least more than about ½ to one inch. The difference in outer diameter of 4½ inch tubing and inner diameter of 7 inch casing is about 1½ inches. However, the tool must expand from the inner diameter of the inner tubular which, for 4½ inch tubing, may be about 3¾ inches depending on the weight. Thus, the expansion required for that operation is about 2¼ inches. This is much greater than the more typical slip assembly expansion required for full bore operation, which may be in the range of about ¼ to ⅜ inches.

It will be noted that the anchor assembly 10 and whipstock assembly 160 require, in the presently preferred embodiment, five shear members, or sets of shear members, for operation. The order of shearing is (1) shear stud 20, (2) shear pin 217, (3) shear pin 182, (4) shearable ends 238 and 240, and (5) shear screw 304. The final three shear members require an upwardly axial pull for shearing and therefore must be sized so that increasingly larger upwardly axial pulls are required to operate in the desired sequential order.

The foregoing disclosure and description of the invention is illustrative and explanatory thereof. It will appreciated by those skilled in the art that various changes in the size, shape and materials, as well as in the details of the illustrated construction or combinations of features of the various anchor and whipstock elements may be made without departing from the spirit of the invention.

What is claimed is:

1. A method for cutting a window at a window depth in a first tubular disposed in a wellbore, *at least* a portion of said first tubular [containing therein] *positioned axially below* a second tubular having [a] *an interior* diameter *and an exterior diameter* less than *an interior diameter of* said first tubular, said second tubular terminating at a lower end, said lower end being disposed at a termination depth in said wellbore less than said window depth, *at least a portion of said second tubular passing through one of said first tubular or another tubular having an interior diameter greater than said exterior diameter of said second tubular,* said method comprising [the following steps]:

inserting a downhole tool into said wellbore;

moving said downhole tool through said second tubular and past said lower end of said second tubular;

securing said downhole tool within said first tubular adjacent said window depth *by activating an anchor portion of said downhole tool to a diameter greater than the internal diameter of said second tubular to secure said downhole tool to said first tubular*;

inserting a cutting member into said first tubular;

guiding said cutting member with said downhole tool to cut said window in said first tubular with said cutting member;

retrieving said cutting member from said wellbore; and retrieving said downhole tool from said wellbore *through said second tubular*.

2. The method of claim 1, wherein [said step of] inserting a downhole tool into said wellbore further comprises:

inserting an anchor assembly into said wellbore; and subsequently inserting a whipstock assembly into said wellbore.

3. The method of claim 2, further comprising:

connecting said anchor assembly and said whipstock assembly together at a depth in said wellbore greater than said lower end of said second tubular.

4. The method of claim 2, wherein [said step of] retrieving said downhole tool further comprises:

simultaneously retrieving said anchor assembly and said whipstock assembly.

5. The method of claim 4, wherein [said step of] simultaneously retrieving further comprises:

sequentially shearing first and second shearable members within said whipstock assembly and said anchor assembly, respectively.

6. The method of claim 5, [further comprising] *wherein inserting said anchor assembly further comprises*:

shearing a third shearable member to separate said anchor assembly from a first wellbore transport member.

7. The method of claim 6, [further comprising] *wherein subsequently inserting a whipstock assembly further comprises*:

shearing a fourth shearable member to separate said whipstock assembly from a second wellbore transport member.

8. The method of claim 2, further comprising:

[expanding] *engaging* a lower portion of a whipstock assembly [into engagement] with said first tubular member.

9. The method of claim 8, wherein [said step of] retrieving said downhole tool from said wellbore further comprises:

[radially retracting] *disengaging* said lower portion of said whipstock assembly *from said first tubular member before said whipstock assembly is retrieved into said lower end of said second tubular*.

10. The method of claim 1, wherein [the step of] securing said downhole tool includes rotatably securing said downhole tool [within] *with respect to* said first tubular.

11. A method for removably positioning a whipstock in a first tubular disposed within a borehole to cut a window in said first tubular, *at least a portion of* the first tubular [containing] *positioned axially below* a second tubular [therein] having [a] *an interior* diameter *and an exterior diameter* less than *an interior diameter of* said first tubular, *at least a portion of said second tubular passing through one of said first tubular or another tubular having an interior diameter greater than said exterior diameter of said second tubular,* the method comprising [the steps of]:

positioning a support member within said first tubular;

[expanding slips on said support member to secure] *securing slips on* said support member [within] *to* said first tubular *axially below said second tubular*;

positioning said whipstock within said first tubular;

securing said whipstock to said support member;

[radially expanding] *engaging* a lower portion of said whipstock [to thereby engage a wall] *with an inner diameter surface* of said first tubular;

cutting said window in said first tubular;

[retracting said radially expanded] *disengaging said* lower portion of said whipstock for retrieval of said whipstock through said second tubular [member]; and

[retracting said slips on said support member to release] *releasing slips on* said support member [for retrieval of] *from said first tubular and retrieving said whipstock and* said support member through said second tubular.

12. The method of claim 11, wherein [said step of retracting said radially expandable] *disengaging said lower* portion of said whipstock further comprises:

shearing at least one pin member.

13. The method of claim 11, further comprising:

simultaneously retrieving said support member and said whipstock through said second tubular.

14. The method of claim 11, wherein [said step of] securing said whipstock to said support member further comprises:

azimuthally orienting said whipstock with respect to said support member.

15. The method of claim 11, wherein [said step of radially expanding] *securing* slips on a support member further comprises:

[expanding] *moving* upper slips radially outwardly; and independently [expanding] *moving* lower slips radially outwardly.

16. The method of claim 11, wherein [said step of retracting said slips on said support member to release] *releasing slips on* said support member comprises:

[retracting] *moving* upper slips radially inwardly; and independently [retracting] *moving* said lower slips radially inwardly.

17. The method of claim 11, wherein [said step of expanding slips on a support member to secure] *securing slips on* said support member [within] *with* said first tubular further comprises:

supporting radial forces acting on [each of] said slips with a first plurality of relatively slidable elements.

18. The method of claim 17, further comprising:

supporting torque forces acting on said slips with keyed members disposed on each of said first plurality of relatively slidable elements.

19. A method for retrievably positioning a downhole anchor within a first tubular supported within a wellbore, *at least a portion of* said first tubular [having therein] *positioned axially below* a second tubular [supported within said first tubular and] having [a] *an interior* diameter *and an exterior diameter* less than *an interior diameter of* the first tubular, [said second tubular having a lower end within said first tubular,]*at least a portion of said second tubular passing through one of said first tubular or another tubular having an interior diameter greater than said exterior diameter of said second tubular, the method* comprising [the following steps]:

connecting said downhole anchor to a wellbore transport member;

inserting said downhole anchor and said wellbore transport member inside of said wellbore containing said first tubular;

moving said downhole anchor and said wellbore transport member past [said] *a* lower end of said second tubular and into said first tubular;

[expanding setting] *engaging* slips on said downhole anchor [to engage] *with* an inner [wall] *diameter surface* of said first tubular;

disconnecting said downhole anchor from said wellbore transport member;

retrieving said wellbore transport member from said wellbore *through said second tubular*;

[retracting said setting] *releasing* slips on said downhole anchor from said inner [wall] *diameter surface* of said first tubular; and retrieving said downhole anchor from said wellbore *through said second tubular*.

20. The method of claim 19, further comprising:

supporting a whipstock assembly on said downhole anchor; and

[expanding] *engaging* a lower portion of said whipstock assembly [to engage] *with* said inner [wall] *diameter surface* of said first tubular.

21. The method of claim 20, further comprising:

[retracting] *disengaging* said lower portion of said whipstock assembly [to disengage] *with* said inner [wall] *diameter surface* of said first tubular *before said whipstock assembly is retrieved into said lower end of said second tubular*.

22. The method of claim 20, further comprising:

securing said whipstock assembly to a second wellbore transport member;

lowering said whipstock assembly through said second tubular; and disconnecting said whipstock assembly from said second wellbore transport member by shearing a shearable member.

23. The method of claim 19, wherein [said step of retracting said setting] *releasing* slips further comprises:

retracting at least one upper slip; and independently retracting at least one lower slip.

24. A method for removably positioning a whipstock in a first tubular disposed within a borehole to cut a window in said first tubular, *a portion* of the first tubular [containing] *positioned axially below* a second tubular [therein] having [a] *an interior* diameter *and an exterior diameter* less than *an interior diameter of* said first tubular, *at least a portion of said second tubular passing through one of said first tubular or another tubular having an interior diameter greater than said exterior diameter of said second tubular,* the method comprising [the steps of]:

positioning a support member within said first tubular;

[expanding] *securing* slips on said support member [to secure said support member within] *with* said first tubular *axially below said second tubular*;

positioning said whipstock within said first tubular;

securing said whipstock to said support member;

[radially expanding] *engaging* a lower portion of said whipstock [to thereby engage a wall] *with an inner diameter surface* of said first tubular;

inserting a cutting member through the second tubular and into said first tubular; [and]

engaging said cutting member with said whipstock to cut said window in said first tubular[.]*; and*

*retrieving said whipstock assembly from said wellbore through said second tubular.*

25. The method of claim 24, further comprising:

[retracting said radially expanded] *disengaging said* lower portion of said whipstock *from said first tubular* for retrieval of said whipstock through said second tubular.

26. The method of claim 25, [wherein said step of retracting said] *further comprising*:

*releasing* slips on said support member [to release said support member comprises:] *from said first tubular by*

[retracting] *moving* upper slips radially inwardly[;] and independently [retracting] *moving* said lower slips radially inwardly.

27. The method of claim 25, further comprising:

simultaneously retrieving said support member and said whipstock through said second tubular.

28. The method of claim 24, wherein [said step of expanding] *securing* slips on a support member further comprises:

[expanding] *moving* upper slips radially outwardly; and independently [expanding] *moving* lower slips radially outwardly.

29. The method of claim 24, wherein [said step of expanding] *securing* slips on a support member [to secure said support member within] *with* said first tubular further comprises:

supporting radial forces acting on each of said slips with a first plurality of relatively slidable elements.

30. A method for retrievably positioning a downhole anchor within a first tubular supported within a wellbore, *at least a portion of* said first tubular [having therein] *positioned axially below* a second tubular [supported within said first tubular and] having [a] *an interior* diameter *and an exterior diameter* less than *an interior diameter of* the first tubular, [said second tubular having a lower end within said first tubular,] *at least a portion of said second tubular passing through one of said first tubular or another tubular having an interior diameter greater than said exterior diameter of said second tubular, the method* comprising [the following steps]:

inserting said downhole anchor inside of said wellbore containing said first tubular;

moving said downhole anchor past [said] *a* lower end of said second tubular and into said first tubular;

[expanding setting] *engaging* slips on said downhole anchor [to engage] *with* an inner [wall] *diameter surface* of said first tubular;

[retracting said setting] *releasing* slips on said downhole anchor from said inner [wall] *diameter surface* of said first tubular; and retrieving said downhole anchor from said wellbore *through said second tubular*.

31. The method of claim 30, wherein [the step of] inserting said downhole anchor further comprises:

interconnecting said downhole anchor and a well transport member; and thereafter inserting said downhole member and said well transport member inside of said wellbore.

32. The method of claim 30, further comprising:

supporting a whipstock assembly on said downhole anchor; and

[expanding] *engaging* a lower portion of said whipstock assembly [to engage] *with* said inner [wall] *diameter surface* of said first tubular.

33. The method of claim 32, further comprising:

[retracting] *disengaging* said lower portion of said whipstock assembly [to disengage] *with* said inner [wall] *diameter surface* of said first *tubular prior to retrieval of said whipstock assembly into said lower end of said second tubular*.

34. The method of claim 30, wherein [said step of retracting said setting] *releasing* slips further comprises:

retracting at least one upper slip; and independently retracting at least one lower slip.

*35. The method of claim 1, wherein said downhole tool includes a whipstock and anchor slips, and retrieving said downhole tool comprises simultaneously retrieving said whipstock and said anchor slips from said wellbore through said second tubular.*

*36. The method as defined in claim 35, wherein retrieving said downhole tool comprises:*

*releasing said anchor slips from secured engagement with said first tubular before said downhole tool is retrieved into said lower end of said second tubular.*

*37. The method of claim 35, wherein retrieving said downhole tool further comprises:*

*shearing a shearable member to effect releasing of said anchor slips from secured engagement with said first tubular.*

*38. The method of claim 35, wherein retrieving said downhole tool further comprises:*

*releasing a rachet lock assembly to permit said anchor slips to move radially inward from secured engagement with said first tubular.*

*39. The method of claim 1, further comprising:*

*said downhole tool includes a whipstock and anchor slips; and*

*azimuthally orientating said whipstock with respect to said anchor slips while connecting said whipstock to said anchor slips secured to said first tubular.*

*40. The method of claim 19, wherein said downhole anchor includes a whipstock, and retrieving said downhole anchor comprises simultaneously retrieving said whipstock and said slips from said wellbore through said second tubular.*

*41. The method of claim 40, wherein retrieving said downhole anchor comprises:*

*releasing said slips from secured engagement with said first tubular before said downhole anchor is retrieved into said lower end of said second tubular.*

*42. The method of claim 40, wherein retrieving said downhole anchor further comprises:*

*shearing a shearable member to effect releasing of said slips from secured engagement with said first tubular.*

*43. The method of claim 40, wherein retrieving said downhole anchor further comprises:*

*releasing a rachet assembly to permit said slips to move radially inward from secured engagement with said first tubular.*

*44. The method of claim 19, further comprising:*

*azimuthally orientating whipstock with respect to said slips while connecting said whipstock to said slips secured to said first tubular.*

*45. The method of claim 30, wherein said downhole anchor includes a whipstock, and retrieving said downhole anchor comprises simultaneously retrieving said whipstock and said slips from said wellbore through said second tubular.*

*46. The method of claim 45, wherein retrieving said downhole anchor comprises:*

*releasing said slips from secured engagement with said first tubular before said downhole anchor is retrieved into said lower end of said second tubular.*

*47. The method of claim 45, wherein retrieving said downhole anchor further comprises:*

*shearing a shearable member to effect releasing of said slips from secured engagement with said first tubular.*

*48. The method of claim 45, wherein retrieving said downhole anchor further comprises:*

*releasing a rachet assembly to permit said slips to move radially inward from secured engagement with said first tubular.*

*49. The method of claim 30, further comprising:*

*azimuthally orientating a whipstock with respect to said slips while connecting said whipstock to said slips secured to said first tubular.*

* * * * *

UNITED STATES PATENT AND TRADEMARK OFFICE

CERTIFICATE OF CORRECTION

PATENT NO. : Re. 36,526

DATED : January 25, 2000

INVENTOR(S) : Britt O. Braddick

It is certified that error appears in the above-identified patent and that said Letters Patent is hereby corrected as shown below:

Claim 33, line 60, delete italicized form of the word "tubular".

Signed and Sealed this

Sixth Day of March, 2001

*Attest:*

Nicholas P. Godici

NICHOLAS P. GODICI

*Attesting Officer*

*Acting Director of the United States Patent and Trademark Office*

US00RE36526C1

(12) REEXAMINATION CERTIFICATE (4703rd)

United States Patent

Braddick

(10) Number: US RE36,526 C1

(45) Certificate Issued: Jan. 7, 2003

(54) RETRIEVABLE THROUGH TUBING TOOL AND METHOD

(75) Inventor: Britt O. Braddick, Houston, TX (US)

(73) Assignee: TIW Corporation, Houston, TX (US)

Reexamination Request:
No. 90/005,844, Oct. 12, 2000

Reexamination Certificate for:

| | |
|---|---|
| Patent No.: | **Re. 036,526** |
| Issued: | **Jan. 25, 2000** |
| Appl. No.: | **09/113,176** |
| Filed: | **Jul. 10, 1998** |

Certificate of Correction issued Mar. 6, 2001.

Related U.S. Patent Documents

Reissue of:

| | |
|---|---|
| (64) Patent No.: | **5,595,247** |
| Issued: | **Jan. 21, 1997** |
| Appl. No.: | **08/409,276** |
| Filed: | **Mar. 23, 1995** |

Related U.S. Application Data

(63) Continuation-in-part of application No. 08/223,704, filed on Apr. 6, 1994, now Pat. No. 5,566,762.

(51) Int. Cl.[7] ..... E21B 29/06

(52) U.S. Cl. ..... 166/297; 166/117.6; 166/123; 166/208; 175/276

(58) Field of Search ..... 166/297, 117.6, 166/123, 208; 175/276

(56) References Cited

U.S. PATENT DOCUMENTS

| | | | | |
|---|---|---|---|---|
| 2,839,142 A | | 6/1958 | Huber | |
| 4,491,178 A | | 1/1985 | Terrell et al. | 166/192 |
| 4,592,427 A | | 6/1986 | Morgan | 166/369 |
| 4,844,167 A | | 7/1989 | Clark | |
| 4,862,957 A | | 9/1989 | Scranton | 166/51 |
| 4,941,532 A | | 7/1990 | Hurt et al. | 166/216 |
| 5,195,591 A | | 3/1993 | Blount et al. | 166/380 |
| 5,211,715 A | | 5/1993 | Braden et al. | 175/58 |
| 5,222,554 A | * | 6/1993 | Blount et al. | 166/117.6 |
| 5,253,714 A | | 10/1993 | Davis et al. | |
| 5,277,251 A | | 1/1994 | Blount et al. | |
| 5,287,921 A | | 2/1994 | Bount et al. | |
| 5,335,737 A | | 8/1994 | Baugh | 175/61 |
| 5,341,873 A | | 8/1994 | Carter et al. | |
| 5,346,017 A | * | 9/1994 | Blount et al. | |
| 5,348,090 A | | 9/1994 | Leismer | 166/211 |
| 5,398,754 A | | 3/1995 | Dinhoble | |
| 5,409,060 A | | 4/1995 | Carter | 166/237 |
| 5,423,387 A | | 6/1995 | Lynde | 175/61 |
| 5,427,179 A | | 6/1995 | Bailey et al. | 166/117 |
| 5,452,759 A | | 9/1995 | Carter et al. | |
| 5,458,196 A | | 10/1995 | George et al. | 166/298 |
| 5,474,126 A | | 12/1995 | Lynde et al. | |
| 5,871,046 A | | 2/1999 | Robison | |

OTHER PUBLICATIONS

Brochure of Baker Oil Tools, a Baker Hughes company, Retrievable Whipstock, 10 pages (1993).

* cited by examiner

*Primary Examiner*—Roger Schoeppel

(57) ABSTRACT

Retrievable window cutting apparatus and method include a whipstock assembly 160 and anchor assembly 10. Whipstock assembly 160 and anchor assembly 10 contract radially inwardly to pass through tubing string T and then expand radially outwardly to operate in casing C. Upper and lower independently moveable slips 24 and 26 engage casing C. Whipstock assembly 160 includes hinge assembly 170 that can be set for operation with a milling assembly 270. Cooperation between shear members in setting tool WSS, working string adaptor 180, hinge assembly 170; and anchor assembly 10 provide for keeping whipstock assembly 160 and anchor assembly 10 in a contracted position for passing downwardly through tubing T, expansion in casing C, and subsequent retrieval through tubing T.

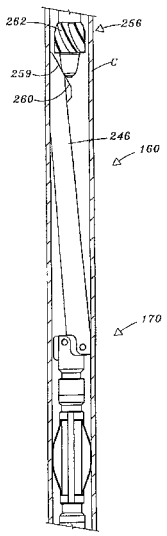

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 11–18 is confirmed.

Claims 1, 19, 20, 24, 30–33, 40, 44, 45 and 49 are determined to be patentable as amended.

Claims 2–10, 21–23, 25–29, 34–39, 41–43 and 46–48 dependent on an amended claim, are determined to be patentable.

1. A method for cutting a window at a window depth in a first tubular disposed in a wellbore, at least a portion of said first tubular positioned axially below a second tubular having an interior diameter and an exterior diameter less than an interior diameter of said first tubular, said second tubular terminating at a lower end, said lower end being disposed at a termination depth in said wellbore less than said window depth, at least a portion of said second tubular passing through one of said first tubular or another tubular having an interior diameter greater than said exterior diameter of said second tubular, said method comprising:

inserting a downhole tool into said wellbore;

moving said downhole tool through said second tubular and past said lower end of said second tubular;

securing said downhole tool within said first tubular adjacent said window depth by activating an anchor portion of said downhole tool to a diameter greater than the internal diameter of said second tubular to *engage said anchor portion with an internal surface of said first tubular and thereby* secure said downhole tool to said first tubular;

inserting a cutting member into said first tubular;

guiding said cutting member with said downhole tool to cut said window in said first tubular with said cutting member;

retrieving said cutting member from said wellbore; and retrieving said downhole tool from said wellbore through said second tubular.

19. A method for retrievably positioning a downhole anchor within a first tubular supported within a wellbore, at least a portion of said first tubular positioned axially below a second tubular having an interior diameter and an exterior diameter less than an interior diameter of the first tubular, at least a portion of said second tubular passing through one of said first tubular or another tubular having an interior diameter greater than said exterior diameter of said second tubular, the method comprising:

connecting said downhole anchor to a wellbore transport member;

inserting said downhole anchor and said wellbore transport member inside of said wellbore containing said first tubular;

moving said downhole anchor and said wellbore transport member past a lower end of said second tubular and into said first tubular;

engaging slips on said downhole anchor with an inner diameter surface of said first tubular;

*supporting a whipstock assembly on said downhole anchor;* disconnecting said downhole anchor from said wellbore transport member *while said whipstock assembly is supported on said downhole anchor*;

retrieving said wellbore transport member from said wellbore through said second tubular;

releasing slips on said downhole anchor from said inner diameter surface of said first tubular; and retrieving said *whipstock assembly and* downhole anchor from said wellbore through said second tubular.

20. The method of claim 19, further comprising: [supporting a whipstock assembly on said downhole anchor; and]

engaging a lower portion of said whipstock assembly with said inner diameter surface of said first tubular.

24. A method for removably positioning a whipstock in a first tubular disposed within a borehole to cut a window in said first tubular, a portion of the first tubular positioned axially below a second tubular having an interior diameter and an exterior diameter less than an interior diameter of said first tubular, at least a portion of said second tubular passing through one of said first tubular or another tubular having an interior diameter greater than said exterior diameter of said second tubular, the method comprising:

positioning a support member within said first tubular;

securing slips on said support member with said first tubular axially below said second tubular;

positioning said whipstock within said first tubular;

securing said whipstock to said support member;

engaging a lower portion of said whipstock with an inner diameter surface of said first tubular;

inserting a cutting member through the second tubular and into said first tubular;

engaging said cutting member with said whipstock to cut said window in said first tubular; and retrieving said whipstock [assembly] from said wellbore through said second tubular.

30. A method for retrievably positioning a downhole anchor within a first tubular supported within a wellbore, at least a portion of said first tubular positioned axially below a second tubular having an interior diameter and an exterior diameter less than an interior diameter of the first tubular, at least a portion of said second tubular passing through one of said first tubular or another tubular having an interior diameter greater than said exterior diameter of said second tubular, the method comprising:

inserting said downhole anchor inside of said wellbore containing said first tubular *with a well transport member*;

moving said downhole anchor past a lower end of said second tubular and into said first tubular;

engaging slips on said downhole anchor with an inner diameter surface of said first tubular;

*supporting a whipstock on the downhole anchor while the slips engage the first tubular;*

*retrieving said well transport member while the whipstock is supported on the downhole anchor;* releasing slips on said downhole anchor from said inner diameter surface of said first tubular; and retrieving said downhole anchor *and said whipstock* from said wellbore through said second tubular.

31. The method of claim 30, wherein inserting said downhole anchor further comprises:

interconnecting said downhole anchor and a well transport member; and thereafter inserting said downhole [member] *anchor* and said well transport member inside of said wellbore.

32. The method of claim 30, further comprising:

[supporting a whipstock assembly on said downhole anchor; and]

engaging a lower portion of said whipstock [assembly] with said inner diameter surface of said first tubular.

33. The method of claim 32, further comprising:

disengaging said lower portion of said whipstock [assembly] with said inner diameter surface of said first tubular prior to retrieval of said whipstock [assembly] into said lower end of said second tubular.

40. The method of claim 19, wherein [said downhole anchor includes a whipstock, and] retrieving said downhole anchor comprises simultaneously retrieving said whipstock *assembly* and said slips from said wellbore through said second tubular.

44. The method of claim 19, further comprising:

azimuthally orientating [whipstock] *said whipstock assembly* with respect to said slips while connecting said whipstock *assembly* to said slips secured to said first tubular.

45. The method of claim 30, wherein [said downhole anchor includes a whipstock, and] retrieving said downhole anchor comprises simultaneously retrieving said whipstock and said slips from said wellbore through said second tubular.

49. The method of claim 30, further comprising:

azimuthally orientating [a] *said* whipstock with respect to said slips while connecting said whipstock to said slips secured to said first tubular.

* * * * *